United States Patent
Kozicki

(10) Patent No.: US 12,307,323 B2
(45) Date of Patent: May 20, 2025

(54) AUTHENTICATION OF IDENTIFIERS BY LIGHT SCATTERING

(71) Applicant: Arizona Board of Regents on behalf of Arizona State University, Scottsdale, AZ (US)

(72) Inventor: Michael N. Kozicki, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/701,030

(22) PCT Filed: Oct. 18, 2022

(86) PCT No.: PCT/US2022/047067
§ 371 (c)(1),
(2) Date: Apr. 12, 2024

(87) PCT Pub. No.: WO2023/069471
PCT Pub. Date: Apr. 27, 2023

(65) Prior Publication Data
US 2025/0005308 A1    Jan. 2, 2025

Related U.S. Application Data

(60) Provisional application No. 63/397,803, filed on Aug. 12, 2022, provisional application No. 63/256,946, filed on Oct. 18, 2021.

(51) Int. Cl.
G06K 7/10    (2006.01)
G06K 7/14    (2006.01)

(52) U.S. Cl.
CPC ....... *G06K 7/10722* (2013.01); *G06K 7/1413* (2013.01)

(58) Field of Classification Search
CPC .................. G06K 7/10722; G06K 7/1413
(Continued)

(56) References Cited

U.S. PATENT DOCUMENTS 4,038,158 A    7/1977    Bursey et al.
4,158,807 A    6/1979    Senturia
(Continued)

FOREIGN PATENT DOCUMENTS

EP    2237183    10/2010
EP    2973209    1/2016
(Continued)

OTHER PUBLICATIONS

Al-SID-Cheikh et al., "Synthesis and characterization of [110mAg]-nanoparticles with application to whole-body autoradiography of aquatic organisms," Appl. Radiat. Isot., 2011, 69(10):1415-1421.
(Continued)

*Primary Examiner* — Ahshik Kim
(74) *Attorney, Agent, or Firm* — Fish & Richardson P.C.

(57) ABSTRACT

Identifying a test pattern includes positioning a test pattern that includes a first multiplicity of particles that reflect or emit light in the field of view of a first imaging device; illuminating the test pattern with light from a first light source; obtaining, with the first imaging device, a first test image of light reflected by the first multiplicity of particles; and comparing the first test image with a first reference image of a reference pattern obtained by a second imaging device.

20 Claims, 16 Drawing Sheets

(58) Field of Classification Search
USPC .................................................. 235/462.41
See application file for complete search history.

(56) References Cited

U.S. PATENT DOCUMENTS

| | | | |
|---|---|---|---|
| 4,586,988 A | 5/1986 | Nath et al. | |
| 4,885,227 A | 12/1989 | Nakamura | |
| 4,889,427 A | 12/1989 | Van Veen et al. | |
| 5,477,088 A | 12/1995 | Rockett et al. | |
| 5,761,115 A | 6/1998 | Kozicki et al. | |
| 5,896,312 A | 4/1999 | Kozicki et al. | |
| 5,914,893 A | 6/1999 | Kozicki et al. | |
| 5,958,590 A | 9/1999 | Kang et al. | |
| 6,084,796 A | 7/2000 | Kozicki et al. | |
| 6,184,456 B1 | 2/2001 | Matsuyama et al. | |
| 6,340,544 B1 | 1/2002 | Akutsu et al. | |
| 6,388,324 B2 | 5/2002 | Kozicki | |
| 6,418,049 B1 | 7/2002 | Kozicki et al. | |
| 6,469,364 B1 | 10/2002 | Kozicki | |
| 6,487,106 B1 | 11/2002 | Kozicki | |
| 6,635,914 B2 | 10/2003 | Kozicki et al. | |
| 6,798,692 B2 | 9/2004 | Kozicki et al. | |
| 6,825,489 B2 | 11/2004 | Kozicki | |
| 6,865,117 B2 | 3/2005 | Kozicki | |
| 6,914,802 B2 | 7/2005 | Kozicki | |
| 6,927,411 B2 | 8/2005 | Kozicki | |
| 6,940,745 B2 | 9/2005 | Kozicki | |
| 6,985,378 B2 | 1/2006 | Kozicki | |
| 6,998,312 B2 | 2/2006 | Kozicki et al. | |
| 7,006,376 B2 | 2/2006 | Kozicki | |
| 7,081,641 B2 | 7/2006 | Kawasaki et al. | |
| 7,097,747 B1 | 8/2006 | Herceg et al. | |
| 7,101,728 B2 | 9/2006 | Kozicki et al. | |
| 7,142,450 B2 | 11/2006 | Kozicki et al. | |
| 7,145,794 B2 | 12/2006 | Kozicki | |
| 7,169,635 B2 | 1/2007 | Kozicki | |
| 7,180,104 B2 | 2/2007 | Kozicki | |
| 7,201,821 B2 | 4/2007 | Hoshino et al. | |
| 7,227,169 B2 | 6/2007 | Kozicki | |
| 7,288,781 B2 | 10/2007 | Kozicki | |
| 7,294,875 B2 | 11/2007 | Kozicki | |
| 7,372,065 B2 | 5/2008 | Kozicki et al. | |
| 7,380,128 B2 | 5/2008 | Bourrieres et al. | |
| 7,385,219 B2 | 6/2008 | Kozicki et al. | |
| 7,402,847 B2 | 7/2008 | Kozicki et al. | |
| 7,405,967 B2 | 7/2008 | Kozicki et al. | |
| 7,438,237 B2 | 10/2008 | Bourrieres et al. | |
| 7,560,722 B2 | 7/2009 | Kozicki | |
| 7,647,279 B2 | 1/2010 | Bourrieres et al. | |
| 7,675,766 B2 | 3/2010 | Kozicki | |
| 7,726,708 B2 | 6/2010 | Bourrieres et al. | |
| 7,728,322 B2 | 6/2010 | Kozicki | |
| 7,763,158 B2 | 7/2010 | Kozicki | |
| 7,783,081 B2 | 8/2010 | Roques et al. | |
| 7,815,117 B2 | 10/2010 | Tuschel et al. | |
| 7,852,451 B2 | 12/2010 | Kim et al. | |
| 8,039,870 B2 | 10/2011 | Burke et al. | |
| 8,056,822 B2 | 11/2011 | Bourrieres et al. | |
| 8,078,875 B2 * | 12/2011 | Cowburn | G06V 10/28 358/448 |
| 8,292,986 B2 | 10/2012 | Goia et al. | |
| 8,322,621 B2 * | 12/2012 | Olmstead | G06K 7/10702 235/462.41 |
| 8,345,910 B2 | 1/2013 | Chae et al. | |
| 8,396,265 B1 | 3/2013 | Ross et al. | |
| 8,576,070 B2 | 11/2013 | Bourrieres et al. | |
| 8,681,325 B2 * | 3/2014 | Dressel | G06V 10/145 356/71 |
| 8,742,531 B2 | 6/2014 | Kozicki | |
| 8,999,819 B2 | 4/2015 | Kozicki et al. | |
| 9,582,751 B2 | 2/2017 | Bourrieres et al. | |
| 9,773,141 B2 | 9/2017 | Kozicki | |
| 9,790,538 B2 | 10/2017 | Berrada et al. | |
| 9,836,633 B2 | 12/2017 | Kozicki | |
| 10,074,000 B2 | 9/2018 | Kozicki | |
| 10,223,567 B2 | 3/2019 | Kozicki | |
| 10,282,480 B2 | 5/2019 | Murrah et al. | |
| 10,467,447 B1 | 11/2019 | Kozicki | |
| 10,503,890 B2 | 12/2019 | Cambou et al. | |
| 10,558,172 B2 | 2/2020 | Kozicki | |
| 10,810,731 B2 | 10/2020 | Kozicki | |
| 11,170,190 B2 | 11/2021 | Kozicki | |
| 11,430,233 B2 | 8/2022 | Kozicki | |
| 11,598,015 B2 | 3/2023 | Kozicki et al. | |
| 11,875,501 B2 | 1/2024 | Kozicki | |
| 2001/0027922 A1 | 10/2001 | Chen et al. | |
| 2002/0004632 A1 | 1/2002 | Lindquist et al. | |
| 2002/0040852 A1 | 4/2002 | Barber et al. | |
| 2002/0055239 A1 | 5/2002 | Tuominen et al. | |
| 2002/0126889 A1 | 9/2002 | Pikler et al. | |
| 2002/0168820 A1 | 11/2002 | Kozicki et al. | |
| 2003/0063772 A1 | 4/2003 | Smith et al. | |
| 2003/0087429 A1 | 5/2003 | Moore | |
| 2004/0026917 A1 | 2/2004 | Bauer et al. | |
| 2004/0072423 A1 | 4/2004 | Jorne et al. | |
| 2004/0104802 A1 | 6/2004 | Becker et al. | |
| 2004/0104807 A1 | 6/2004 | Ko | |
| 2004/0112962 A1 | 6/2004 | Farrall et al. | |
| 2004/0174257 A1 | 9/2004 | Kuhns et al. | |
| 2005/0275831 A1 | 12/2005 | Silver | |
| 2006/0021938 A1 | 2/2006 | Diallo | |
| 2006/0029855 A1 | 2/2006 | Ji et al. | |
| 2006/0086901 A1 | 4/2006 | Price et al. | |
| 2006/0146515 A1 | 7/2006 | Hwang et al. | |
| 2006/0159329 A1 | 7/2006 | Joshi et al. | |
| 2007/0090918 A1 | 4/2007 | Engstrom et al. | |
| 2007/0132998 A1 | 6/2007 | Tang et al. | |
| 2007/0275230 A1 | 11/2007 | Murphy et al. | |
| 2008/0027651 A1 | 1/2008 | Sieknneier et al. | |
| 2008/0041499 A1 | 2/2008 | Grassi et al. | |
| 2008/0179405 A1 | 7/2008 | Benderly | |
| 2008/0219503 A1 | 9/2008 | Di Venuto et al. | |
| 2008/0260941 A1 | 10/2008 | Jin | |
| 2009/0001802 A1 | 1/2009 | Diallo et al. | |
| 2009/0017284 A1 | 1/2009 | Dionigi et al. | |
| 2009/0186756 A1 | 7/2009 | Cheng et al. | |
| 2009/0242416 A1 | 10/2009 | Yun et al. | |
| 2009/0258241 A1 | 10/2009 | Shiraishi et al. | |
| 2009/0323959 A1 | 12/2009 | Hara | |
| 2010/0007896 A1 | 1/2010 | Fishbaine | |
| 2010/0164219 A1 | 7/2010 | Jeacock et al. | |
| 2010/0193365 A1 | 8/2010 | Lopatin et al. | |
| 2010/0200649 A1 | 8/2010 | Callegari et al. | |
| 2010/0216026 A1 | 8/2010 | Lopatin et al. | |
| 2010/0284585 A1 | 11/2010 | Wang et al. | |
| 2010/0330425 A1 | 12/2010 | Lopatin et al. | |
| 2011/0000970 A1 | 1/2011 | Abraham | |
| 2011/0143811 A1 | 6/2011 | Rodriguez | |
| 2011/0205542 A1 | 8/2011 | Pendell Jones et al. | |
| 2011/0253789 A1 | 10/2011 | Thiele et al. | |
| 2011/0254117 A1 | 10/2011 | Kozicki | |
| 2012/0080528 A1 | 4/2012 | Crowley | |
| 2012/0169647 A1 | 7/2012 | Kuo et al. | |
| 2012/0323787 A1 | 12/2012 | Nelsen | |
| 2013/0022238 A1 | 1/2013 | Wood et al. | |
| 2013/0026645 A1 | 1/2013 | Mohammed et al. | |
| 2013/0088555 A1 | 4/2013 | Hanina | |
| 2013/0088583 A1 | 4/2013 | Northcott et al. | |
| 2013/0092735 A1 | 4/2013 | Liu et al. | |
| 2013/0117078 A1 | 5/2013 | Weik, III et al. | |
| 2013/0127959 A1 | 5/2013 | Hanina | |
| 2013/0220413 A1 | 8/2013 | Kozicki et al. | |
| 2013/0228821 A1 | 9/2013 | Kozicki et al. | |
| 2014/0086474 A1 | 3/2014 | Le | |
| 2014/0105449 A1 | 4/2014 | Caton et al. | |
| 2014/0119612 A1 | 5/2014 | Wang et al. | |
| 2014/0138041 A1 | 5/2014 | Jarry et al. | |
| 2014/0169647 A1 | 6/2014 | Ruszczycki et al. | |
| 2014/0185891 A1 | 7/2014 | Schoennneyer et al. | |
| 2014/0297545 A1 | 10/2014 | Prasad et al. | |
| 2014/0316044 A1 | 10/2014 | Wang et al. | |
| 2014/0379529 A1 | 12/2014 | Agasti et al. | |
| 2015/0084984 A1 | 3/2015 | Tomii et al. | |
| 2015/0194545 A1 | 7/2015 | Kozicki et al. | |

(56) References Cited

U.S. PATENT DOCUMENTS

| | | | |
|---|---|---|---|
| 2015/0247252 | A1 | 9/2015 | Montemor et al. |
| 2016/0012310 | A1 | 1/2016 | Kozicki |
| 2016/0034758 | A1 | 2/2016 | Kozicki |
| 2016/0078617 | A1 | 3/2016 | Kozicki |
| 2016/0086001 | A1 | 3/2016 | Kozicki |
| 2016/0259970 | A1 | 9/2016 | Wee et al. |
| 2017/0148480 | A1* | 5/2017 | Hamersley ....... G11B 20/00086 |
| 2017/0180451 | A1 | 6/2017 | Shaffer et al. |
| 2017/0185880 | A1 | 6/2017 | Lin et al. |
| 2017/0246323 | A1 | 8/2017 | Tomalia et al. |
| 2018/0008967 | A1 | 1/2018 | Yu et al. |
| 2018/0051176 | A1 | 2/2018 | Okada et al. |
| 2018/0088059 | A1 | 3/2018 | Kozicki |
| 2018/0286035 | A1 | 10/2018 | Kozicki |
| 2019/0197265 | A1 | 6/2019 | Kozicki |
| 2019/0218707 | A1 | 7/2019 | Pollini et al. |
| 2019/0262897 | A1 | 8/2019 | Zhao et al. |
| 2019/0354733 | A1 | 11/2019 | Kozicki |
| 2020/0117882 | A1 | 4/2020 | Kozicki |
| 2020/0130066 | A1 | 4/2020 | Zhao et al. |
| 2020/0272797 | A1 | 8/2020 | Kozicki |
| 2021/0157888 | A1 | 5/2021 | Kozicki |
| 2021/0230763 | A1 | 7/2021 | Kozicki et al. |
| 2021/0295497 | A1 | 9/2021 | Kozicki |
| 2022/0027620 | A1 | 1/2022 | Kozicki |

FOREIGN PATENT DOCUMENTS

| | | |
|---|---|---|
| EP | 2973234 | 1/2016 |
| EP | 2998949 | 3/2016 |
| EP | 2998950 | 3/2016 |
| EP | 3002744 | 4/2016 |
| EP | 3007155 | 4/2016 |
| FR | 2890666 | 3/2007 |
| JP | 2010-090443 | 4/2010 |
| WO | WO 1997/048032 A2 | 12/1997 |
| WO | WO 1997/048032 A3 | 12/1997 |
| WO | WO 1998/048319 | 10/1998 |
| WO | WO 2000/048196 | 8/2000 |
| WO | WO 2007/102988 | 9/2007 |
| WO | WO 2010/008567 | 1/2010 |
| WO | WO 2010/077622 | 7/2010 |
| WO | WO 2012/065076 | 5/2012 |
| WO | WO 2012/065083 | 5/2012 |
| WO | WO 2012/177845 | 12/2012 |
| WO | WO 2014/165047 | 10/2014 |
| WO | WO 2014/165148 | 10/2014 |
| WO | WO 2016/072874 A1 | 5/2016 |
| WO | WO 2016/073910 | 5/2016 |
| WO | WO 2017/062425 | 4/2017 |
| WO | WO 2019/126656 | 6/2019 |
| WO | WO 2019/210129 | 10/2019 |
| WO | WO 2021/092121 A1 | 5/2021 |

OTHER PUBLICATIONS

Bae et al., "Biomimetic Microfingerprints for Anti-Counterfeiting Strategies," Advanced Materials, 2015, 27(12):2083-2089.
Balakrishnan et al., "A low power non-volatile memory element based on copper in deposited silicon oxide," 7th Annual Non-Volatile Memory Technology Symposium, 2006, pp. 104-110.
Baloukas, "Thin Film-Based Optically Variable Security Devices: From Passive to Active," Ecole polytechnique de Montreal, Aug. 1, 2012, pp. 1-249, XP055876886.
Berthier et al., "Multiscaled polarization effects in *Suneve coronata* (Lepidoptera) and other insects: application to anti-counterfeiting of banknotes," Applied Physics A, Oct. 11, 2006, 86:123-130.
BonAppetit.com [online], "The 15 Most Common Counterfeit Foods—and How to Identify Them," Feb. 4, 2014, retrieved on Dec. 13, 2021, retrieved from URL <https://www.bonappetit.com/entertaining-style/trends-news/slideshow/counterfeit-foods>, 12 pages.
Butera, "Fractal Electrodes," NNIN REU Research Accomplishments, 2012:176-177.

CDC.gov [online], "Multistate Outbreak of *E. coli* 0157:H7 Infections Linked to Romaine Lettuce (Final Update)," Jun. 28, 2018, retrieved Dec. 13, 2021, retrieved from URL <https://www.cdc.gov/ecoli/2018/o157h7-04-18/index.html>, 10 pages.
Chaudhuri et al., "Texture Segmentation Using Fractal Dimension," IEEE Transactions on Pattern Analysis and Machine Intelligence, 1995, 17(1):72-77.
Chen et al., "Polarization-based method for object surface orientation information in passive millimeter-wave imaging," IEEE Photonics Journal, Feb. 2016, 8(1):1-12.
Chen et al., "Ultrasonically Assisted Synthesis of 3D Hierarchical Silver Microstructures," The Journal of Physical Chemistry C, 2009, 113(44):19258-19262.
Cheung et al., "Implementation issues in RFID-based anti-counterfeiting systems," Computers in Industry, Apr. 7, 2011, 62(7):708-718.
Chi et al., "Consistency penalized graph matching for image-based identification of dendritic patterns," IEEE Access, Jun. 26, 2020, 8:11863-118637.
Devadas et al.,"Design and Implementation of PUF-Based "Unclonable" RFID ICs for Anti-Counterfeiting and Security Applications," 2008 IEEE International Conference On RFID, Apr. 16-17, 2008:58-64.
Ding et al., "Tuning the surface enhanced Raman scattering activity of gold nanocubes by silver coating," Applied Surface Science, 2015, 357:487-492.
Edwards et al., "Reconfigurable Memristive Device Technologies," Proceedings of the IEEE, Jul. 2015, 103(7):1004-1033.
Extended European Search Report in European Application No. 22884384.3, mailed on Jan. 9, 2025, 11 pages.
EurekAlert.org [online], "Stealth Mark licenses ORNL invisible micro-taggant for anticounterfeiting applications," Jun. 25, 2018, retrieved on Dec. 13, 2021, retrieved from URL <https://www.eurekalert.org/pub_releases/2018-06/drnl-sml062518.php>, 3 pages.
Extended European Search Report in International Appln. No. 18817477.5, dated Feb. 16, 2021, 9 pages.
Fleury et al., "Rapid electroplating of insulators," Nature, Apr. 2002, 416(6882):716.
Forbes.com [online], "The 2008 Milk Scandal Revisited," Jul. 16, 2014, retrieved on Dec. 13, 2021, retrieved from URL <https://www.forbes.com/sites/yanzhonghuang/2014/07/16/the-2008-milk-scandal-revisited/#2786cbee4105>, 3 pages.
Han et al., "Lithographically Encoded Polymer Microtaggant Using High-Capacity and Error-Correctable QR Code for Anti-Counterfeiting of Drugs," Advanced Materials, 2012, 24(44):5924-5929.
Han et al., "Magnetic Silver Hybrid Nanoparticles for Surface-Enhanced Resonance Raman Spectroscopic Detection and Decontamination of Small Toxic Molecules," ACS Nano, 2013, 7(4):3212-3220.
Heer et al., "Single-chip Microelectronic System to Interface with Living Cells," Biosensors and Bioelectronics, 2007, 22(11):2546-3553.
Hu et al., "Photonic anti-counterfeiting using structural colors derived from magnetic-responsive photonic crystals with double photonic bandgap heterostructures," Journal of Material Chemicals, 2012, 22:11048-11053.
IBM.com [online], "Pairing AI with Optical Scanning for Real-World Product Authentication," May 23, 2018, retrieved on Dec. 13, 2021, retrieved from URL <https://www.ibm.com/blogs/research/2018/05/ai-authentication-verifier/>, 8 pages.
Ilic et al., "Synchronized Secrets Approach for RFID-enabled Anti-Counterfeiting," Internet of Things Conference 2008 (Zurich, CH), retrieved on May 15, 2013, dated Jan. 1, 2008, retrieved from the URL: <http://www.stop-project.eu/Portals/1/publications/080128_Demo_IoT_v07.pdf>, 4 pages.
ImageJ.net [online], "Analyze Skelton," available on or before Jan. 17, 2018, via Internet Archive: Wayback Machine URL <https://web.archive.org/web/20180117122909/https://imagej.net/AnalyzeSkeleton>, retrieved on Feb. 28, 2020, from URL <https://imagej.net/AnalyzeSkeleton>, 14 pages.

(56) References Cited

OTHER PUBLICATIONS

Imai et al., "Anisotropic Growth of Silver Crystals with Ethylenediamine Tetraacetate and Formation of Planar and Stacked Wires," Crystal Growth & Design, 2005, 5(3):1073-1077.

Independent.co.uk [online], "Cracking down on China's dangerous fake food sector," Aug. 7, 2017, retrieved on Dec. 13, 2021, retrieved from URL <https://www.independent.co.uk/news/world/asia/china-fake-food-sector-unlicensed-products-knock-offs-supply-chain-contamination-public-health-a7880341.html>, 7 pages.

International Search Report and Written Opinion in International Appln. No. PCT/US22/47067, mailed on Mar. 27, 2023, 15 pages.

International Search Report and Written Opinion for International Application No. PCT/US2019/029284, dated Aug. 1, 2019, 9 pages.

Je et al., "In situ tuning of a MEMS microphone using electrodeposited nanostructures," Journal of Micromechanics and Microengineering, 2009, 19 035015, 8 pages.

Jordan et al., "Identifying Counterfeit Medicines with Industry-Suitable Technologies," Pharmaceutical Engineering, Official Magazine of ISPE, Anti-Counterfeiting Technologies, May/Jun. 2012, 32(3), 7 pages.

Katsuki et al., "High Magnetic Field Effect on the Growth of 3-Dimensional Silver Dendrites," Chemistry Letters, 2002, 31(12):1186-1187.

Koushanfar, "Provably Secure Active IC Metering Techniques for Piracy Avoidance and Digital Rights Management," IEEE Transactions on Information Forensics and Security, Feb. 1, 2012, 7(1):51-63.

Kozicki et al., "Electrodeposit formation in solid electrolytes," 7th Annual Non-Volatile Memory Technology Symposium, 2006:111-115.

Kozicki et al., "Flow regulation in microchannels via electrical alteration of surface properties," Superlattices and Microstructures, Sep. 1, 2003, 34(3-6):467-473.

Kozicki et al., "Information storage using nanoscale electrodeposition of metal in solid electrolytes," Superlattices and Microstructures, Sep. 1, 2003, 34(3-6):459-465.

Kozicki et al., "Nanoscale effects in devices based on chalcogenide solid solutions," Superlattices and Microstructures, 2000, 27(5/6):485-488.

Kozicki et al., "Nanostrcuture of solid electrolytes and surface electrodeposits," Physica E, 2003, 19(1-2):161-166.

Kuo et al., "Formation of Silver Nanoparticles under Structured Amino Groups in Pseudo-dendritic Poly(allylamine) Derivatives," J. Phys. Chem. B, 2003, 107(41):11267-11272.

Lee et al., "Preparation of Silver Dendritic Nanoparticles Using Sodium Polyacrylate in Aqueous Solution," Chemistry Letters, Jan. 2004, 33(2):118-119.

Lee et al., "Universal process-inert encoding architecture for polymer microparticles," Nature Materials, 2014, 13(5):524.

Lee, "Micro-Technology for Anti-Counterfeiting," Microelectronic Engineering, 2000, 53:513-516.

Levin et al., "Senate Armed Services Committee Releases Report on Counterfeit Electronic Parts," May 21, 2012, retrieved on Feb. 28, 2020, retrieved from URL <https://www.armed-services.senate.gov/press-releases/senate-armed-services-committee-releases-report-on-counterfeit-electronic-parts>, 4 pages.

Liu et al., "Controllable Synthesis of Silver Dendrites via an Interplay of Chemical Diffusion and Reaction," Industrial & Engineering Chemistry Research, 2016, 55(30):8319-8326.

Liu et al., "Fabrication of Infrared Left-Handed Metamaterials via Double Template-Assisted Electrochemical Deposition," Advanced Materials, Jun. 4, 2008, vol. 20, No. 11, pp. 2050-2054, XP055876818.

Liu et al., "Multiple Pass-Band Optical Left-Handed Metamaterials Based on Random Dendritic Cells," Advanced Functional Materials, 2008, 18(21):3523-3528.

Lowe, "Object recognition from local scale-invariant features," Proceedings of the International Conference on Computer Vision 2, Sep. 1999:1150-1157.

Mitkova et al., "Morphology of electrochemically grown silver deposits on silver-saturated Ge—Se thin films," Journal of Non-Crystalline Solids, 2003, 326&327:425-429.

NaturalNews.com [online], "Sticky PLU Labels on Fruit Provide Useful Health Information," Jul. 28, 2008, retrieved on Dec. 13, 2021, retrieved from URL <http://www.naturalnews.com/023711_fruit_labels_health.html>, 10 pages.

Ngo et al., "Paper surfaces functionalized by nanoparticles," Advances in Colloid and Interface Science, 2011, 163(1):23-38.

Nguyen-thi et al., "On the interest of synchrotron X-ray imaging for the study of solidification in metallic alloys," Comptes Rendus-Physique, Jan. 20, 2012, 13(3):237-245.

Nocke et al., "Dielectrophoretic alignment of polymer compounds for thermal sensing," Sensors and Actuators A: Physical, Nov. 1, 2009, 156(1):164-170.

Organization for Economic Co-operation and Development, "Global trade in fake goods worth nearly half a trillion dollars a year—OECD & EUIPO," 2016, retrieved Mar. 5, 2020, retrieved from URL <https://www.oecd.org/industry/global-trade-in-fake-goods-worth-nearly-half-a-trillion-dollars-a-year.htm>, 2 pages.

Popularmechanics.com, "The Pentagon Uses Plant DNA to Catch Counterfeit Parts," Nov. 21, 2016, retireved on Dec. 13, 2021, retrieved from URL <https://www.popularmechanics.com/military/research/a23988/plant-dna-pentagon-counterfeit/>, 6 pages.

Psilodimitrakopoulos et al., "Quantitative Imaging of Microtubule Alteration as an Early Marker of Axonal Degeneration after Ischemia in Neurons," Biophysics Journal, Mar. 2013, 104(5):968-975.

ResearchandMarkets.com [online], "Global Brand Counterfeiting Report, 2018," available on or before May 28, 2019, via Internet Archive: Wayback Machine URL <https://web.archive.org/web/20190528093101/https://www.researchandmarkets.com/research/7j712n/global_brand?w=4>, retrieved on Feb. 28, 2020, URL <https://www.researchandmarkets.com/research/7j712n/global_brand?w=4>, 12 pages.

Riley, "How Barcodes Can Help Fight Food Fraud," Food Engineering, Sep. 2017, retrieved from URL <https://www.foodengineeringmag.com/articles/96990-how-barcodes-can-help-fight-food-fraud>, 3 pages.

Roysam et al., "Farsight: A Divide and Conquer Methodology for Analyzing Complex and Dynamic Biological Microenvironments," Microscopic Image Analysis for Life Science Applications; Atech House Series Bioinformatics & Biomedical imaging, Jan. 1, 2008:115-152.

Ruffato et al., "Design, fabrication and characterization of Computer Generated Holograms for anti-counterfeiting applications using OAM beams as light decoders," Scientific Reports, 2017, 7(18011):1-13.

Russo et al., "Study of Multilevel Programming in Programmable Metallization Cell (PMC) Memory," IEEE Transactions on Electron Devices, May 1, 2009, 56(5):1040-1047.

Sato-Berrú et al., "Silver nanoparticles synthesized by direct photoreduction of metal salts. Application in surface-enhanced Raman spectroscopy," J. Raman Spectrosc., Oct. 20, 2008, 40(4):376-380.

Sawada et al., "Dendritic and Fractal Patterns in Electrolytic Metal Deposits," Physical Review Letters, Mar. 24, 1986, 56(12):1260-1263.

Schindelin et al., "Fiji: an open-source platform for biological-image analysis," Nature Methods, 2012, 9(7):676-682.

Seas.harvard.edu [online], "Technique makes holograms highly efficient, secure," Harvard School of Engineering and Applied Sciences, May 13, 2016, retrieved on Janurary 30, 2017, retrieved from internet: <URL:https://www.seas.harvard.edu/news/2016/05/technique-makes-holograms-highly-efficient-secure>, 4 pages.

Sekerka, "A Stability Function for Explicit Evaluation of the Mullins-Sekerka Interface Stability Criterion," Journal of Applied Physics, 1965, 36(1):264-268.

Serre et al., "A Theory of Object Recognition: Computations and Circuits in the Feedforward Path of the Ventral Stream in Primate Visual Cortex," Computer Science and Artificial Intelligence Laboratory Technical Report, MIT-CSAIL-TR-2005-082, Dec. 19, 2005, 131 pages.

(56) References Cited

OTHER PUBLICATIONS

Skoric et al., "Experimental Hardware for Coating PUFs and Optical PUFs," In: "Security with Noisy data" by Pim Tuyls et al., Jan. 1, 2007, pp. 256-268.

Smafield et al., "Automatic Dendritic Length Quantification for High Throughput Screening of Mature Neurons," Neuroinformatice, Humana Press Inc., Apr. 9, 2015, 13(4):443-458.

Socol et al., "Suspensive Electrode Formation in Pulsed Sonoelectrochemical Synthesis of Silver Nanoparticles," Langmuir, 2002, 18(12):4736-4740.

Spectrum.ieee.org [online], "How Blockchain Technology Could Track and Trace Food From Farm to Fork," Aug. 29, 2018, retrieved on Dec. 13, 2021, retrieved from URL <http://theinstitute.ieee.org/resources/standards/how-blockchain-technology-could-track-and-trace-food-from-farm-to-fork>, 8 pages.

Tanaka, "Factors leading to ionic migration in lead-free solder," Oct. 1, 2002, retrieved on Feb. 26, 2019, retrieved from URL <https://www.test-navi.com/eng/report/pdf/FactorsLeadingToIonicMigrationInLead-freeSolder.pdf>, 9 pages.

TruTags.com [online], "Counterfeiting," available on or before Nov. 2017, retrieved on Dec. 13, 2021, retrieved from URL <https://trutags.com/anti-counterfeiting-solution/>, 6 pages.

Tuyls et al., "Anti-Counterfeiting," Security with Noisy data, Jan. 1, 2007:290-312.

Valehi et al., "A graph matching algorithm for user authentication in data networks using image-based physical unclonable functions," 2017 Computing Conference (London, UK, Jul. 18-20, 2017), 2017:863-870.

Verwer et al., "Descriptive and comparative analysis of geometrical properties of neuronal tree structures," Journal of Neuroscience Methods, Oct. 1, 1986, 18(1-2):179-206.

Wang, et al., "Synthesis of silver dendritic nanostructures protected by tetrathiafulvalene," Chemical Communications, 2002, 12:1300-1301.

WHO.int [online], "Food Safety," 2017, retrieved on Dec. 12, 2021, retrieved from URL <https://www.who.int/news-room/fact-sheets/detail/food-safety>, 7 pages.

Wikipedia.org [online], "Photographic developer," Wikipedia, Oct. 14, 2018, retrieved Mar. 5, 2020, retrieved from URL <https://en.wikipedia.org/w/index.php?title=Photographic_developer&oldid=864027112>, 6 pages.

Witten et al., "Diffusion-Limited Aggregation, a Kinetic Critical Phenomenon," Physical Review Letters, Nov. 9, 1981, 47(19) 1400-1403.

Xiao et al., "Novel Ultrasonically Assisted Templated Synthesis of Palladium and Silver Dendritic Nanostructures," Advanced Materials, 2001, 13(24):1887-1891.

Yan et al., "Application of RFID and Internet of Things in Monitoring and Anti-Counterfeiting for Products," 2008 International Seminar on Business and Information Management, IEEE Computer Society, Dec. 19, 2008:392-395.

Zhao et al., "Photochemical synthesis of dendritic silver nanoparticles for anti-counterfeiting," Journal of Materials Chemistry C, vol. 7, Apr. 29, 2019, pp. 6099-6104.

Zhao et al., "Simple and eco-friendly preparation of silver films coated on copper surface by replacement reaction," Applied Surface Science, 2012, 258(19):7430-7434.

Zhao, "Bottom-up fabrication methods of optical metamaterials," Journal of Materials Chemistry, Jan. 1, 2012, vol. 22, No. 19, p. 9439-9449, XP055876820.

Zhou et al., "A Novel Ultraviolet Irradiation Photoreduction Technique for the Preparation of Single-Crystal Ag Nanorods and Ag Dendrites," Adv. Mater., 1999, 11(10):850-852.

\* cited by examiner

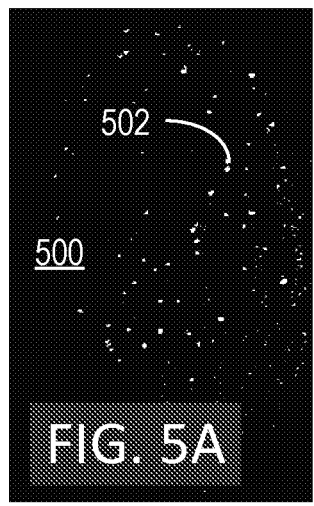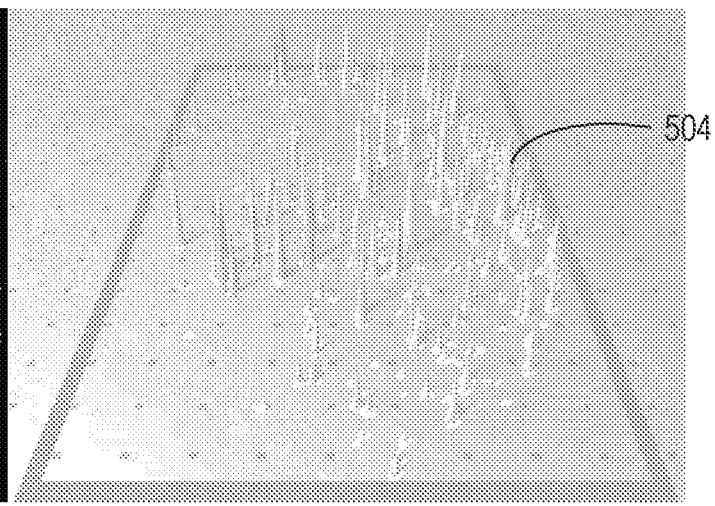
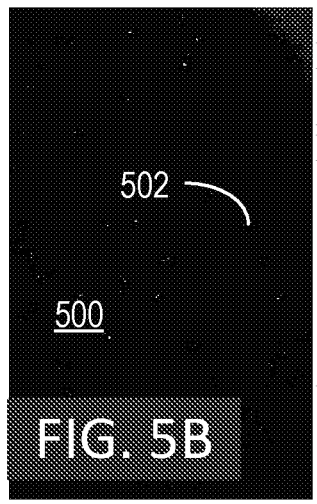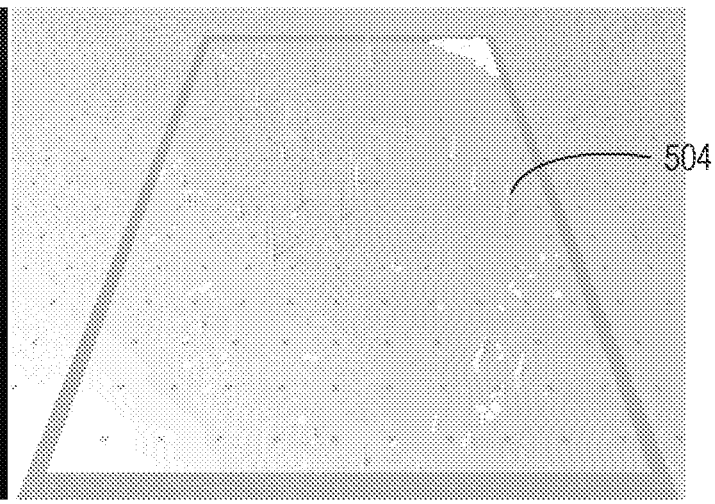

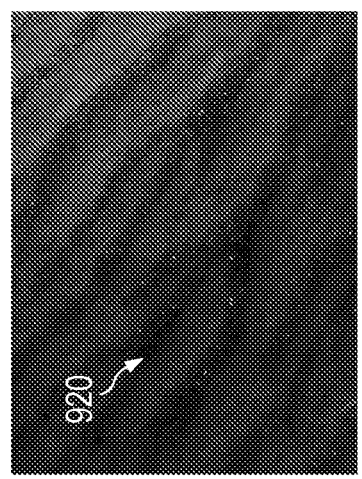
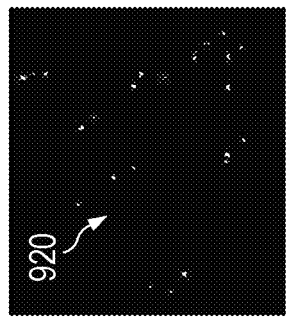
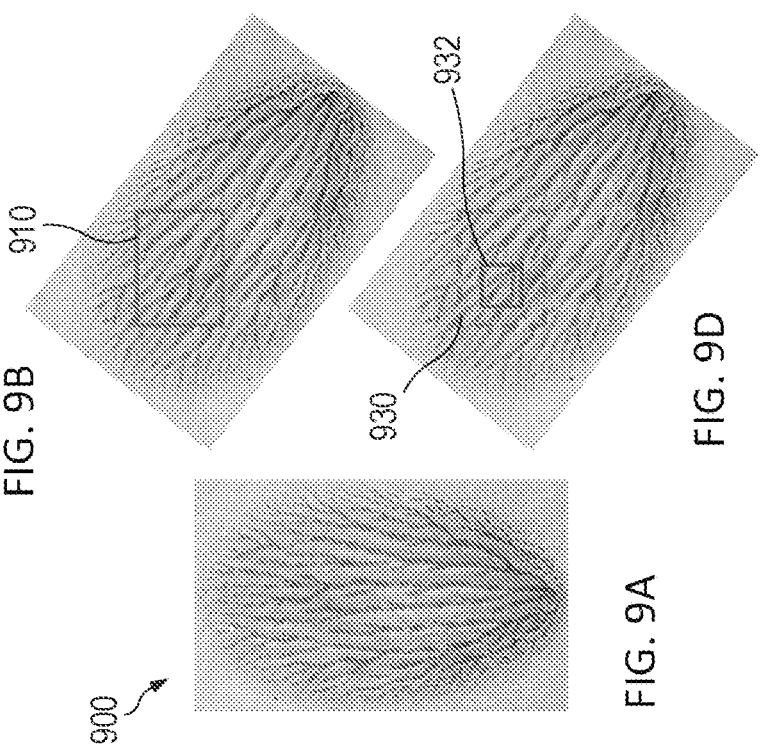
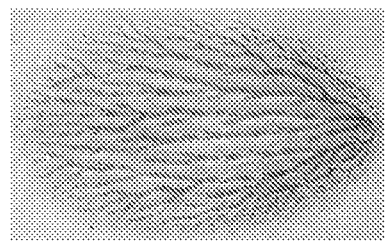

AUTHENTICATION OF IDENTIFIERS BY LIGHT SCATTERING

CROSS-REFERENCE TO RELATED APPLICATIONS

This application is a National Stage Application under 35 U.S.C. § 371 of International Application No. PCT/US2022/047067, filed on Oct. 18, 2022, which claims the benefit of U.S. patent application Ser. Nos. 63/256,946, 63/397,803 entitled "AUTHENTICATION OF IDENTIFIERS BY LIGHT SCATTERING" filed on Oct. 18, 2021, and Aug. 12, 2022, respectively, the contents of both of which are incorporated herein by reference in their entireties.

STATEMENT OF GOVERNMENT SUPPORT

This invention was made with government support under 2020-67017-33078 awarded by the USDA. The government has certain rights in the invention.

TECHNICAL FIELD

This invention relates to authentication of identifiers (e.g., patterns) that contain elements that scatter, reflect, or emit light.

BACKGROUND

Most supply chains have a non-secure connection between items in the channel and corresponding information in a database, typically in the form of labels with machine-readable symbols (barcodes, etc.). These labels can be forged or copied and applied to fake or substandard items to misrepresent origin and quality. In addition, many identifiers in use today, such as barcodes and quick response (QR) codes, are not specific to individual items but instead represent product types.

SUMMARY

This disclosure describes the use of patterns with light scattering particles to authenticate and uniquify the patterns. The quantity of possible pattern variations caused by the random positioning of hundreds or thousands of particles can be much greater than the number of items that would ever be tagged, so unique labeling is assured without having to deliberately program such variations during manufacture.

Although the disclosed inventive concepts include those defined in the attached claims, it should be understood that the inventive concepts can also be defined in accordance with the following embodiments.

Embodiment 1 is a method of identifying a test pattern, the method comprising:
  positioning a test pattern in the field of view of a first imaging device, wherein the test pattern is on a first substrate and comprises a first multiplicity of particles that reflect or emit light;
  illuminating the test pattern with light from a first light source, wherein the light from the first light source defines a first test angle of incidence with respect to the first substrate and a first test azimuthal angle with respect to an optical axis of the first imaging device;
  obtaining, with the first imaging device, a first test image of light reflected by the first multiplicity of particles, wherein the first test image comprises first indicia associated with the first test angle of incidence and the first test azimuthal angle; and
  comparing the first test image with a first reference image of a reference pattern obtained by a second imaging device, wherein the reference pattern is on a second substrate and comprises a second multiplicity of particles that reflect light, and the first reference image comprises second indicia associated with the second alignment feature and is obtained by illuminating the reference pattern with light from a reference light source that defines a first reference angle of incidence with respect to the second substrate and a first reference azimuthal angle with respect to an optical axis of the second imaging device.

Embodiment 2 is the method of embodiment 1, wherein:
  the test pattern or the first substrate comprises a first fiducial mark, the first imaging device comprises a first alignment mark, and obtaining the first test image comprises aligning or superimposing the first fiducial mark and the first alignment mark, and
  the reference pattern or the second substrate comprises a second fiducial mark, the second imaging device comprises a second alignment mark, and obtaining the first reference image comprises aligning or superimposing the second fiducial mark and the second alignment mark, Embodiment 3 is the method of embodiment 2, further comprising altering the first alignment mark based on differences associated with i) the first test angle of incidence with respect to the first substrate and the first test azimuthal angle with respect to the optical axis of the first imaging device, and ii) the first reference angle of incidence with respect to the second substrate and the first reference azimuthal angle with respect to the optical axis of the second imaging device.

Embodiment 4 is the method of any one of embodiments 1-3, wherein comparing the first test image with the first reference image comprises comparing the first indicia and the second indicia.

Embodiment 5 is the method of embodiment 4, further comprising identifying the test pattern as the reference pattern based on overlap between the first indicia and the second indicia.

Embodiment 6 is the method of any one of embodiments 1-5, further comprising:
  illuminating the test pattern with light from a second light source, wherein the light from the second light source defines a second test angle of incidence with respect to the substrate and a second test azimuthal angle with respect to the optical axis of the first imaging device; and
  obtaining a second test image of light reflected by the first multiplicity of particles.

Embodiment 7 is the method of embodiment 6, further comprising comparing the second test image with a second reference image of the reference pattern, and the second reference image is obtained by illuminating the reference pattern with light from the reference light source at a second reference angle of incidence with respect to the second substrate and a second reference azimuthal angle with respect to the optical axis of the second imaging device.

Embodiment 8 is the method of embodiment 6 or 7, wherein a difference between the first test azimuthal angle and the second test azimuthal angle is about 180° or less.

Embodiment 9 is the method of embodiment 8, wherein a difference between the first test azimuthal angle and the second test azimuthal angle is about 90° or less.

Embodiment 10 is the method of any one of embodiments 1-9, wherein positioning the test pattern comprises positioning the test pattern in an enclosure configured to contain light from the first light source and inhibit reflection of stray light.

Embodiment 11 is the method of any one of embodiments 1-10, wherein the first test angle of incidence with respect to the substrate is less than 40°.

Embodiment 12 is the method of any one of embodiments 1-11, wherein the first test angle of incidence with respect to the substrate is less than 20°.

Embodiment 13 is the method of any one of embodiments 1-12, wherein comparing the first test image with the first reference image comprises comparing a portion of the first test image with a corresponding portion of the first reference image.

Embodiment 14 is the method of any one of embodiments 1-13, wherein the first light source is an LED light source.

Embodiment 15 is the method of any one of embodiments 1-14, where in the first light comprises visible radiation, ultraviolet radiation, or infrared radiation.

Embodiment 16 is the method of any one of embodiments 1-15, wherein obtaining the first test image comprises capturing the first test image with the first imaging device.

Embodiment 17 is the method of any one of embodiments 1-16, further comprising adjusting a position of the first light source with respect to the test pattern.

Embodiment 18 is the method of any one of embodiments 1-17, further comprising adjusting a position of the first imaging device with respect to the test pattern.

Embodiment 19 is the method of any one of embodiments 1-18, wherein the first test angle of incidence is above a critical angle of reflection.

Embodiment 20 is the method of any one of embodiments 1-19, wherein the first test angle of incidence is below a critical angle of reflection.

Embodiment 21 is the method of any one of embodiments 1-20, wherein the test pattern comprises a barcode, a dendritic structure, or one or more alphanumeric characters.

Embodiment 22 is the method of embodiment 21, wherein the barcode comprises a one-dimensional barcode or a two-dimensional barcode.

Embodiment 23 is the method of embodiment 22, wherein the one-dimensional barcode comprises a linear barcode.

Embodiment 24 is the method of embodiment 24, wherein the two-dimensional barcode comprises a QR code.

Embodiment 25 is the method of any one of embodiments 1-24, wherein the test pattern comprises an optically transparent covering opposite the first substrate.

Embodiment 26 is the method of any one of embodiments 1-25, wherein the first substrate is optically transparent.

Embodiment 27 is the method of any one of embodiments 1-26, wherein the particles of the first multiplicity of particles and the second multiplicity of particles are fluorescent particles, and the first light source is an ultraviolet light source.

Embodiment 28 is the method of any one of embodiments 1-27, wherein the pattern extends up to about 20 microns from a surface of the substrate.

Embodiment 29 is the method of any one of embodiments 1-28, wherein the particles of the first multiplicity of particles and the second multiplicity of particles are in the shape of flakes.

Embodiment 30 is the method of any one of embodiments 1-29, wherein a maximum dimension of the particles of the first multiplicity of particles and the second multiplicity of particles is up to about 150 microns, up to about 100 microns, up to about 50 microns, or up to about 10 microns.

Embodiment 31 is method of identifying a test pattern, the method comprising:

positioning an apparatus comprising a light source and an imaging device in a first orientation with respect to a test pattern on a substrate, wherein the test pattern comprises a multiplicity of particles that reflect or emit light and the first orientation of the device comprises a first pitch, a first roll, and a first yaw of the device with respect to the substrate;

illuminating the test pattern with light from the light source;

imaging light reflected by the multiplicity of particles with the imaging device to yield a first test image comprising a first multiplicity of bright regions;

positioning the apparatus comprising the light source and the imaging device in a second orientation with respect to the test pattern, wherein the second orientation comprises a second pitch, a second roll, and a second yaw of the device with respect to the substrate, wherein the first roll and the second roll are different;

illuminating the test pattern with the light source; and imaging light reflected by the multiplicity of particles with the imaging device to yield a second test image comprising a second multiplicity of bright regions, wherein a location and intensity of the first multiplicity of bright regions in the first test image differs from a location and intensity of the second multiplicity of bright regions in the second test image.

Embodiment 32 is the method of embodiment 31, further comprising comparing the first test image and the second test image with a corresponding reference images obtained from a reference pattern.

Embodiment 33 is the method of embodiments 31 or 32, further comprising, based on the comparing, identifying the test pattern as the reference pattern.

Embodiment 34 is the method of any one of embodiments 31-33, wherein the test pattern comprises a barcode, a dendritic structure, or one or more alphanumeric characters.

Embodiment 35 is the method of embodiment 34, wherein the barcode comprises a one-dimensional barcode or a two-dimensional barcode.

Embodiment 36 is the method of any one of embodiments 31-35, wherein the one-dimensional barcode comprises a linear barcode.

Embodiment 37 is the method of any one of embodiments 31-36, wherein the two-dimensional barcode comprises a QR code.

Embodiment 38 is the method of any one of embodiments 31-37, wherein the test pattern comprises an optically transparent covering opposite the substrate.

Embodiment 39 is the method of any one of embodiments 31-38, wherein the substrate is optically transparent.

Embodiment 40 is the method of any one of embodiments 31-39, wherein the pattern extends up to about 20 microns from a surface of the substrate.

Embodiment 41 is the method of any one of embodiments 31-40, wherein the particles are in the shape of flakes.

Embodiment 42 is the method of any one of embodiments 31-41, wherein a maximum dimension of the particles is up to about 150 microns, up to about 100 microns, up to about 50 microns, or up to about 10 microns.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 2A is a phone camera view of a full pattern with 100 µm metal flakes. FIG. 2B is a polarization micrograph of a branch of a pattern with 10-60 µm metal flakes.

FIGS. 5A and 5B are processed images of FIGS. 4B and 4C, respectively.

FIGS. 9A-9E illustrate how a reduced area, adjusted contrast image of a pattern can be obtained.

DETAILED DESCRIPTION

Figure 1:
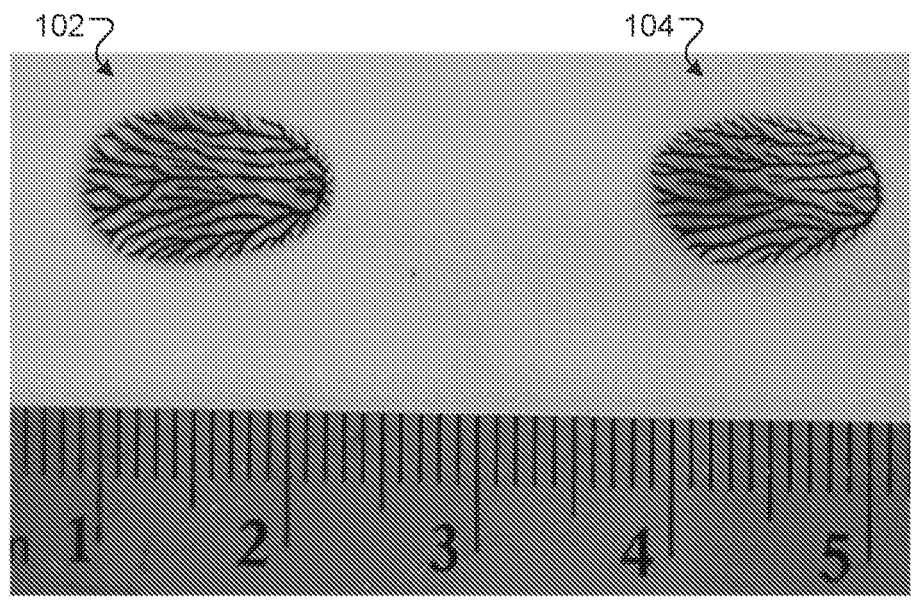
FIG. 1 depicts acrylic dendrites made by a compression-separation process in a roller press.

In general, patterns can be used as identifiers. One example of a pattern is a barcode used to identify a product. Some patterns are easy to duplicate, making them susceptible to counterfeiting. An array of light reflecting particles embedded on or in a pattern can allow authentication of the pattern as non-counterfeit by comparing the patterns of reflected light with reference patterns of reflected light. In addition, these patterns of reflected light are unique for each pattern into which the light reflecting particles are incorporated due to the random positioning of these particles in the pattern.

In this disclosure, "pattern" generally refers to one or more features that can be used to identify an item. Suitable patterns include barcodes, dendritic structures, and one or more alphanumeric character(s), barcodes, dendritic structures, or other structures. The barcodes can be one-dimensional (e.g., linear barcodes) or two-dimensional (e.g., QR codes). A pattern can be formed by printing or depositing ink in a pattern on a substrate. Printing or depositing an ink can include pressing (e.g., with a roller) or stamping (e.g., with a vertical force) the ink on a substrate, thereby transferring the ink to the substrate. A volume of the ink can be in a range of about 1 µL to about 10 µL. Examples of printing include offset printing or rotogravure printing. Examples of depositing a pattern include disposing an ink on a substrate and compressing or stamping the ink (e.g., with a template). The stamping can be achieved with a vertical force equivalent to about 0.5 kg to about 1.5 kg (e.g., about 1 kg), followed by separation of the substrate and the template.

Dendrites are intricate branching structures that emerge naturally from Laplacian instabilities in a variety of systems. As described herein, "dendrite" generally refers to unique stochastically branching patterns fabricated of inorganic or organic materials (e.g., an organic polymer) by a variety of methods.

As disclosed herein, the unclonability and uniqueness of a pattern can be achieved with the presence of light scattering elements in the pattern (e.g., in the form of reflecting particles, flakes, or crystals), separately or together with the complexity of the pattern (e.g., the shape of a dendrite and its random geometric elements) to provide a unique identifier. In some cases, the light scattering elements are added to a fluid medium used to make a pattern prior to the formation process, so that the particles become embedded in the final pattern. In some cases, the light scattering elements are added after the pattern is created, such that the light scattering elements are present on the surface (e.g., not in an interior portion) of the pattern. In both cases, the reflecting surfaces on the particles come to rest at random angles and give the pattern a unique optical signal caused by the way that the light scattering elements reflect incident light. This pattern of reflected light would be difficult to copy or clone, as it would involve the precise placement of hundreds or thousands of similar reflectors within (or on) the pattern.

Embodiments in this application are described with respect to patterns formed with an ink that contains light-scattering elements. The ink typically includes a polymeric material (e.g., an acrylic, such as an acrylic paint) as a medium. In some cases, the polymeric material is optically transparent. The light-scattering elements can be composed at least partially of metal, mica, polymers, organic crystals (e.g., sugar), or inorganic crystals (e.g., silica, salt), and typically have a largest linear dimension (e.g., a length) in a range of about 1 µm to about 200 µm (e.g., about 5 µm to about 60 µm). A concentration of the light-scattering elements in the ink is selected to achieve light scattering sufficient to achieve a desired level of security. In some cases, the concentration of light-scattering elements is in a range of about 0.01 g/mL to about 0.1 g/mL of ink. In one example, the ink is 25:1 Liquitex Glossy Acrylic Medium: Liquitex Mars Black Softbody Acrylic Paint (for tint/contrast) mixed with 5-60 μm diameter metal flakes at a concentration of 0.0626 g/ml, leading to particle concentrations on the order of 1,000/μl in the 50 to 60 μm range and over 50,000/μl below 20 μm. The patterns typically have a dimension (e.g., a thickness or a diameter) in a range between 10 microns and 1000 microns in a final (hardened) form, and contain scattering elements (e.g., reflective flakes, such as metal flakes) in an interior of the pattern, on a surface of the pattern, or both.

The (random) positioning of each light scattering element in a pattern means that light incident on the pattern at a particular angle will be reflected at an angle determined at least in part by the orientation of the light scattering element, its depth below the surface of the pattern, and the refractive index of the materials involved. If the light source is the bright flash of a device with a camera (e.g., a smart phone), only certain flakes will be in a position to reflect the light directly into the camera lens. The flakes that reflect light directly into the camera lens will change based at least in part on the position of the device relative to the pattern.

This disclosure describes high-speed, high-volume manufacturing of patterns containing light scattering elements, such as deterministic patterns that include barcodes, QR codes, text, and graphics, and stochastic patterns including dendrites based on the Saffman-Taylor effect in viscous fluids. In the printing of deterministic patterns, the material containing the reflecting particles (e.g., acrylic medium with metallic flakes) is applied to the print surface using a roller or stamp that has the pattern image on it (e.g., as in an intaglio plate in rotogravure printing or in an offset printing scheme), such that the resulting printed pattern has a relief in the order of 1 μm to 100 μm in height. In the scheme used to form stochastic dendritic patterns by the Saffman-Taylor effect, a small amount (e.g., a few microliters) of fluid (e.g., an acrylic medium) is compressed between two surfaces. The surfaces are then separated to form a pattern in the fluid. In both cases, the printed ink is allowed to dry or harden via, for example, exposure to air, heat, ultraviolet light, or chemical hardening agents. These processes can be implemented in roll-to-roll volume manufacturing on standard printing equipment. An example of a pair of patterns 102 and 104 made in a roller press on a plastic substrate from acrylic medium containing a black pigment is shown in FIG. 1. The patterns 102 and 104 are large enough to be scanned by a device such as a cell phone camera, so that tracking can be performed from producer to consumer without the need for new physical infrastructure or offline analysis. The patterns also have a subtle relief, with ridges in the order of a few tens of microns high, which leads to an anti-cloning capability.

The shape of some patterns with random geometric elements (e.g., a dendrite with random geometrical elements) can provide unique identifiers. In some cases, however, there may be a concern that the pattern can be replicated by high resolution photographic, printing, or micro-casting processes. This replication could result in the production of fake tags that misrepresent the origin or authenticity of items to which they are attached.

Figure 2A:
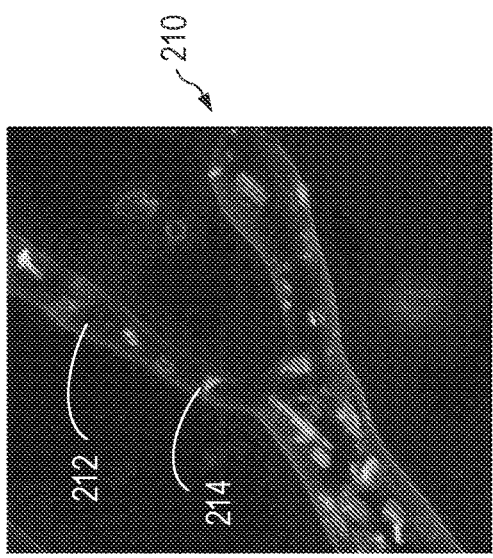
FIGS. 2A and 2B depict patterns with embedded metal flakes.
Figure 2B:
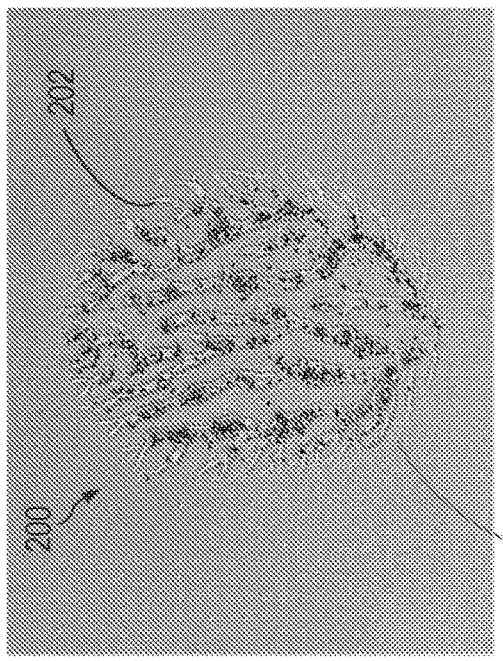

A fluid-based stamping method or the fluid-based formation method described herein allows the addition of light scattering elements to the material system that can be used to thwart cloning and provide a high level of security. Micro-scale light scattering features in the form of reflecting particles can be added to the fluid medium and thus become embedded in the final pattern. This is demonstrated by FIGS. 2A and 2B, which show pattern 200 and pattern portion 210, respectively, composed of clear acrylic medium 202 and 212, respectively, with embedded metallic particles (e.g., flakes) 204 and 214, respectively, having a size of about 100 μm and about 5-60 μm, respectively. The reflecting surfaces on particles 204 and 214 come to rest at random angles within the ridges and give the pattern a unique optical signal caused by the way the particles scatter incident light. The random positioning of each particle means that incident light coming in from a particular direction will be reflected at an angle determined by the particle orientation and its position in the medium.

Figure 3:
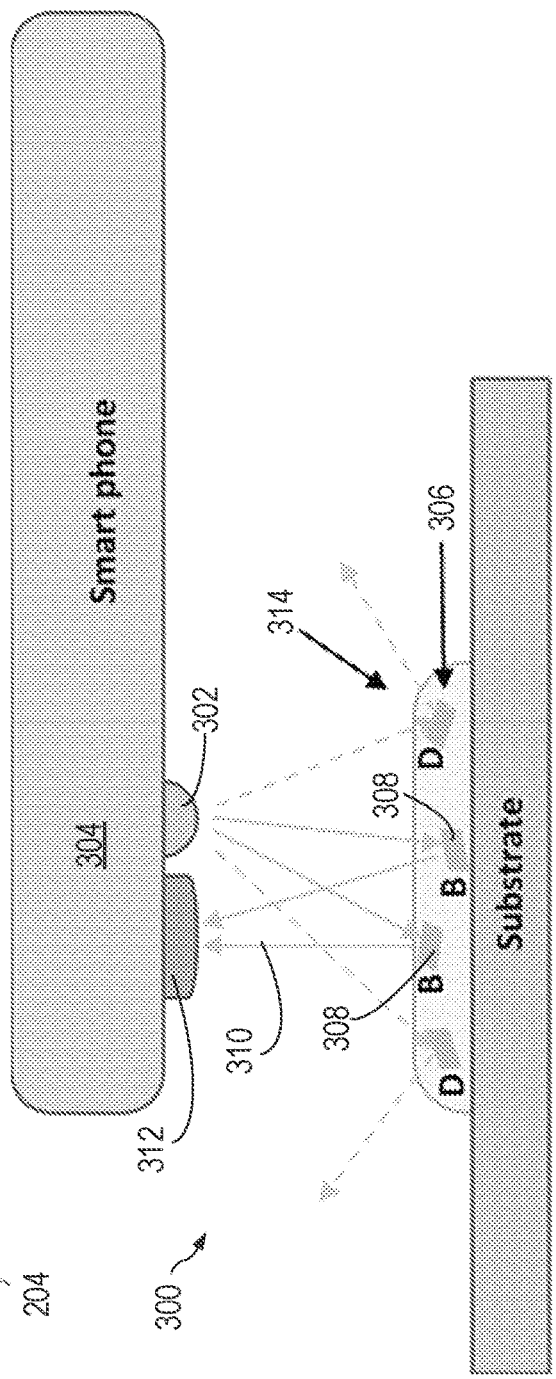
FIG. 3 is schematic of a pattern authentication scheme involving light reflected from embedded particles. The angle of each reflecting surface allows the light from the phone flash to directly enter the camera to create a bright spot (B) or be directed away to create a dark spot (D).

Referring to system 300 in FIG. 3, if the light source is the flash 302 of a device 304 (e.g., a cell phone or "smart" phone), a subset of particles 306 (e.g., particles 308) will be in the right location to reflect the light 310 directly into the camera lens 312 of device 304. Which particles will do this in any particular pattern can change based at least in part on the position of the device relative to the pattern 314. In one example, pattern 314 can be similar to pattern 200 or pattern 210 of FIGS. 2A and 2B, respectively. As device 304 with active camera 312 and flash 302 is swept across pattern 314, the pattern appears to reflect light (or "sparkle") to the camera in a way that is visibly unique to each pattern. This effect would be difficult to copy or clone, as it would involve the precise placement of hundreds or thousands of reflectors within an already complex pattern. This application of light scattering elements can be used in other patterns (e.g., one or more alphanumeric characters, or patterns that represent numerical identifiers, such as bar codes and QR codes, or graphics) in addition to dendritic identifiers.

Figure 4C:
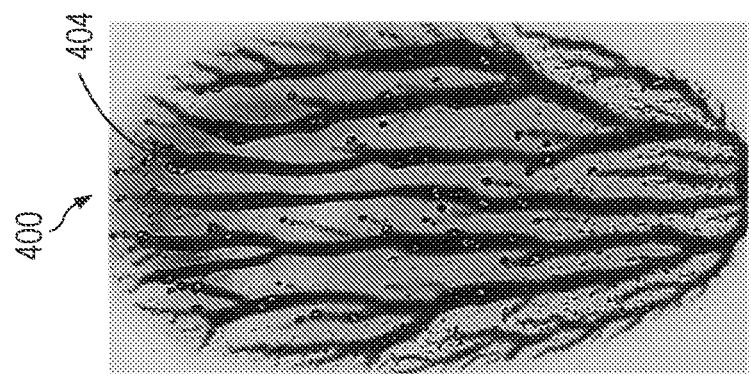
FIGS. 4A-4C are flash photographs taken at zero pitch, 10° right roll, and 20° right roll, respectively of a pattern with 100 µm embedded metal flakes.
Figure 4B:
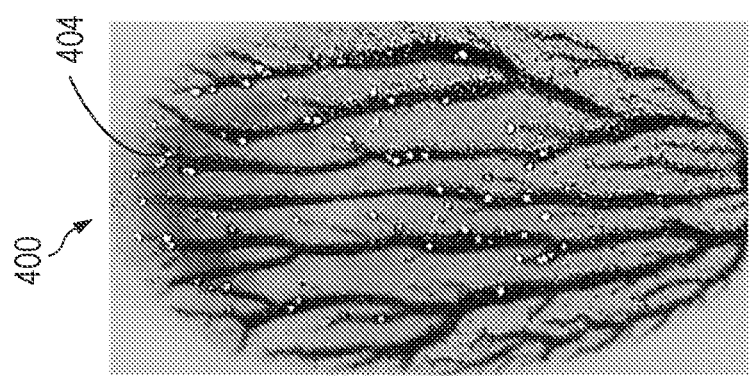
Figure 4A:
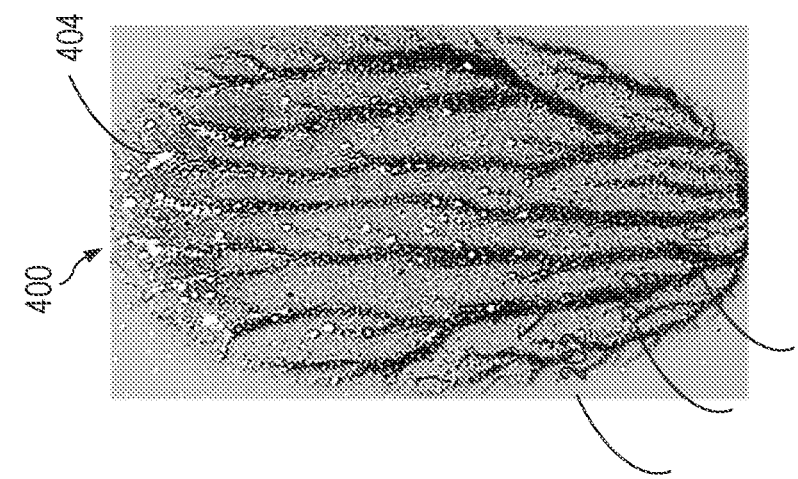

An example of the results of this technique is given in FIGS. 4A-C, which show three images of the same black tinted acrylic dendrite 400 with 100 μm metal flakes 404 embedded in the acrylic. These images were taken by a cell phone camera, using the flash as the primary light source. The pitch of the phone was kept constant at zero degrees (parallel to the image surface) and the roll was adjusted to produce illumination/view at zero, 10° right, and 20° right, in FIGS. 4A-4C, respectively. As the phone is rotated, fewer flakes are in a position to reflect the light from the flash back into the camera, and the bright spots disappear. For these formation parameters, the acrylic is around 10 micrometers thick in its main branches which means that the largest angle to the surface that any 100 micrometer diameter metal flake may take is $\tan^{-1}(10/100)=5.7°$, i.e., they will mostly be lying nearly flat in this case. So, light coming in substantially off-normal to the surface will not be reflected back into the cell phone camera, just as seen in the 20° roll right case (FIG. 4C).

FIGS. 5A and 5B are processed images of FIGS. 4B and 4C, respectively, so that only strongly reflected light is seen and not the background. The strongly reflected light is seen either as white dots 500 on a black background 502 (left images) or as a 3D rendering in which the height of the peaks 504 corresponds to the intensity of the received light (right images). The left images were taken with the light source and camera within the critical angle so that the reflections are strong, and the right images were taken beyond this critical angle so that the reflections are weak.

Smaller flakes in the same thickness of acrylic can take up a larger range of angles. For example, 50 μm diameter flakes in a 10 μm thick medium can have a maximum angle of $\tan^{-1}(10/50)=11.3°$, so their reflections will begin to disappear at an angle that is approximately twice this (around) 23°. A greater range of possible scattering angles leads to a more complicated light scattering signal, which will make the pattern even more difficult to copy exactly.

This light scattering effect can be used in a scheme that "authenticates" the pattern—confirms that it is genuine and not merely a photographic copy or even a three-dimensional (3D) copy created using an impression mold—by creating a reference dataset that captures the scattering angles of each pattern or some subset of the scattering population. Creating the reference dataset can be performed during manufacturing of the pattern or along with the initial application at a secure point in a supply chain. The capture mechanism can be a stationary multi camera system or single camera with a coincident light source that is swept over each pattern to map each scattering angle. This reference dataset can be stored under the digital identifier derived from the pattern's shape or by the patterns created by the reflected light at predetermined illumination and/or viewing angles on a (secure) server. In the supply chain, the pattern can be read by a device such as an app-equipped smart phone that can send the image of the pattern for geometric analysis on the server or the pattern's unique ID derived from a local analysis of its geometry to the server. If the ID is matched with one that is held in the system, the server can return the expected scattering from that pattern based on the relative positions of flash and camera lens for the particular device used. On being prompted by the app, the user would scan the pattern with the device using a physical motion so that the light source reflects off multiple scattering sites at multiple angles. Since the patterns of reflected light will depend on the position of the device's camera and flash relative to the identifier and its reflecting elements, fiducial marks may also be included next to the pattern to ensure that the device is in the correct position to capture the patterns of reflected light that can be accurately matched with the reference dataset. As part of this scanning process, the differences in device camera to flash positioning in different devices can be compensated for by software installed on the device or on the server. Any bright reflections registered during the authentication scan would be matched with the expected positions in the dataset. If more than some minimum number of scattering events are matched, the device would send a verification signal to the server, whereupon the server would declare the pattern and item as being genuine and release the item details to the user (typically in the form of a specific URL).

Identification Methods

Methods and systems for authenticating unique stochastically branching patterns that are relatively dense but with fine features and diffusion-limited aggregation (DLA)—like branching (e.g., Brownian trees) or densely branching morphologies (DBM) are disclosed. For example, pattern variations in dendrites arise from mechanisms involved in formation of the dendritic structure. Formation of dendritic structures can be achieved by a variety of processes, including multi-fluid methods, and yield dendrites formed of materials such as organic polymers. In some cases, a plurality of members extending away from a common point of the dendritic structure to form a stochastically branched arrangement of the members, wherein regions of the dendritic structure are stochastically self-similar to the entire dendritic structure.

With a robust identification and verification process, patterns, such as dendrites, can be used as unique and trusted identifiers for any type of traceable item. Identification and verification can be achieved by mobile imaging, with trustworthy image analytics rooted in geometry and topological methods, so that tracking can be performed throughout a supply chain. In one example, mobile imaging can be achieved with a cell phone. The use of global cell phone infrastructure is advantageous at least in part due to ready accessibility and ease of data sharing.

For dendrites, the number of possible patterns depends on the fractal dimension of the shape (related to its complexity and density), the magnification and resolution of the measurement technique used to examine the dendrite, and the mathematical basis of the reading scheme. Thus, the number of possible dendritic patterns is vast, even for dendrites "read" by a device such as a cell phone camera, allowing a different dendrite to be created for every item produced, mined, grown, or manufactured over any reasonable timeframe. Computationally, fractal-structures in dendrites can be represented accurately by topological analysis methods. Topological features are robust to conditions typical in mobile imaging. such as changes in lighting, viewpoint, noise, and blur.

Deterministic patterns such as barcodes or QR codes can be individually identified or uniquified by adding a stochastic element that can be read and associated with that particular instance of the pattern. In this regard, the addition of reflecting particles not only provides the possibility of pattern authentication but also allows individual pattern identification, as the positions of these particles are random in the material and hence scattered light patterns will be different for each instance of pattern formation.

In some embodiments, patterns can be read optically. To implement optical reading, the pattern is interrogated using light, which can include wavelengths within and/or outside the visible spectrum, to produce a unique signal. For example, camera imaging may be used to obtain a detailed picture of the pattern. The acquired pattern can then be algorithmically analyzed to produce a unique code or identifier associated with the pattern that acts as a type of "fingerprint". Cell phone cameras can be used to capture images that are analyzed to identify the pattern.

Various levels of detail may result from optical imaging, depending on the magnification and numerical aperture of the lenses used. For example, using a lens with a high numerical aperture, the focal plane may be swept along the z-axis (i.e., the axis normal to the main surface over which the pattern extends) to reveal fine topographical details of the pattern.

A series of steps can be used for identifying a tagged article. In a first step, one or more images of the pattern's tag are acquired. The images can be acquired using a variety of image capturing devices including, for example, a mobile telephone with or without an imaging module.

Next, the pattern's tag is authenticated. In the context of this disclosure, authentication refers to the process of verifying that the pattern's tag is actually the pattern's tag and not a copy or replica of a tag. As discussed above, patterns may be created with a subtle three-dimensional shape. In contrast, many two-dimensional copies or replicas have only two-dimensional structure. This difference in dimensionality can be used to authenticate tags featuring dendritic structures.

In particular, to authenticate a pattern, multiple images of the pattern can be obtained using low angle illumination from different angles. A pattern that includes features extending in the perpendicular direction reflect light from its different facets in the perpendicular direction. Accordingly, "bright" regions in the multiple images will change as a function of the angle of illumination.

Using similar illumination and image capture techniques for a pattern's tag, images of the pattern therein can be obtained from multiple illumination angles. In some embodiments, color filters can be used to filter the illumination light so that the illumination light is distinguishable from ambient light in images of the pattern's tag. By filtering the illumination light (e.g., light generated from an illumination source such as a flash unit of a mobile telephone), only the edges of the pattern that face the illumination source are illuminated with the filtered light, and therefore appear in a different color than other features in the image. In addition to, or as an alternative to, obtaining multiple images from different illumination directions, the device used to image the pattern's tag can also record video of the pattern's tag illuminated from different directions, showing a varying pattern of illumination as the illumination direction changes.

Analysis of the images can be performed to determine whether different features of the patterns are highlighted as the illumination direction varies by determining which regions appear brightest in each of the images. In some embodiments, for example, as the reflected light changes with illumination angle, a three-dimensional representation of the outer facets of the pattern feature can be constructed to convert intensity and position of the reflected light to the angle, height, and position of the reflecting surfaces to verify that the features of the pattern are indeed three-dimensional in nature, and not two-dimensional. If the angles and heights of the reflecting surfaces all lie within a thin planar region, the likelihood that the structure is a copy rather than a true pattern is increased. The distribution of angles and/or heights can be compared to a threshold value or distribution to determine whether a particular pattern contained in the tag is authentic or not.

In some embodiments, the observed changes in reflected light angles and positions as a function of illumination direction are sufficient to establish that a pattern is three-dimensional. The distribution of reflected light angles and/or positions can be compared to a threshold value or distribution for purposes of establishing an authentication of the pattern contained in the tag.

In either of the methods disclosed above, image processing is typically performed in the device that captures the images. In some embodiments, however, some or all of the image processing functions can be performed by one or more remote computing devices (e.g., one or more remote servers) by transmitting some or all of the acquired images at various illumination directions and/or angles to the remote device. Alternatively, or in addition, video of the changing light reflection as a function of illumination angle and/or direction can be transmitted to the remote computing device and used to authenticate or reject the pattern's tag.

In certain embodiments, reflected light images obtained by illuminating the pattern with different colors of light can provide additional information that can be used to authenticate the patterns. For example, when the device used to illuminate the structures includes a tunable laser-based source, reflected light images corresponding to both different illumination directions and different illumination wavelengths can be obtained. Even when illumination occurs from a common direction, when the illumination light is of a different wavelength, reflected light images of certain patterns may appear different, and these differences indicate that what is being imaged is a true three-dimensional pattern, not a two-dimensional copy.

In some embodiments, the three-dimensional nature of the pattern can be further confirmed by comparing the differing patterns of reflected light to database records that include patterns of reflected light, as a function of illumination direction, for authentic tags of patterns. For example, the measured reflected light profiles can be decomposed to identify "sources" of reflected light in each image, each source having a position, a size, and an integrated intensity. Some or all of these attributes of the identified sources can then be compared with similar information derived from database records to determine whether the observed reflected light images match a particular database record, thereby authenticating the tag from which the images were measured. As described above, the database records can also include patterns of reflected light that correspond to illumination with different wavelengths of light, and this information can also be used together with, or as an alternative to, information derived from images corresponding to different illumination directions to authenticate specific patterns.

Using the foregoing methods, a pattern's tag applied to an article can be either authenticated as genuine, or rejected as a likely counterfeit copy or replica. If the pattern's tag attached to the article is authenticated, then the image(s) of the pattern's tag can be analyzed to extract features of the pattern in the tag. In general, each of the analysis steps disclosed herein can be performed by the device used to acquire the tag image(s), or by one or more remote computing devices (e.g., one or more servers), after the image(s) has/have been transmitted to the remote device from the image capture device.

As a first step in the analysis, a captured image may be adjusted to filter extraneous features and produce a line segment representation of the pattern. The adjustment can take a variety of forms. In some embodiments, the image is adjusted by altering the contrast and/or brightness of a grayscale version of the image so that a thinned representation of the pattern is produced. One or more reference patterns printed on the pattern's tag can be used for this purpose. For example, the contrast and/or brightness of the image can be altered so that two adjacent reference patterns on the tag have a particular separation between them. The contrast and/or brightness of all images of the same pattern's tag can then be adjusted so that in each image, the separation between the two reference patterns is the same.

In some embodiments, fiducials can be printed on a pattern's tag. Fiducials can be used for a number of functions. In some embodiments, fiducials can be used to indicate directions from which tags can be illuminated to obtain reflected light images of the pattern(s) therein, as described above, to authenticate the tags. The fiducials provide indicators for users who scan the tags as part of a supply chain, for example, to ensure that the images that are obtained correspond to images that were used to generate database information that was stored for the tags, and that is used later to authenticate and/or identify the tags.

In certain embodiments, fiducials are used as points of reference for the analysis of the pattern. As an example, for radial tags with a central growth point, a center minutiae point can be the fiducial. Further, vectors associated with the line segments of the pattern can be obtained through analysis. A vector can correspond to a number set that defines the length and angle of a line segment that extends between two points.

A variety of different analysis techniques can be used to perform pattern feature recognition. In some embodiments, for example, a scale-invariant feature transformation (SIFT) can be used to compare a captured image with a reference image. This technique transforms an image into a collection of vectors, each of which is invariant to translation, scaling, and rotation, and to a certain extent illumination changes and localized distortion. Image recognition algorithms of this type can be applied to raw images (e.g., without adjustment to thin the images) and are typically robust. As such, these methods are well suited for identification of features in images, which can be distorted by physical damage to the tag that includes the pattern, and/or by imperfect imaging conditions.

After the set of features corresponding to the pattern's tag has been identified, the set of features can be compared to records in a database in to identify the tag (and the article to which the tag is attached). Typically, this step is performed by a remote computing device to which the image(s) of the pattern or extracted set of features have been transmitted. The remote computing device may also host the database, or be configured to access the database over a secured connection.

If the set of features obtained through analysis is sufficiently accurate, then a unique match to only one database record will occur, uniquely identifying the tag. As discussed above, the database records are typically generated when tags are applied to articles and scanned, prior to manufacture, shipment, or storage of the tagged articles. Database records are maintained in secure storage to prevent unauthorized access and alteration, and therefore function as an analogue of a fingerprint database for tagged articles.

In general, comparison between the set of features obtained by analysis of images of a particular pattern's tag and database records will yield a number of potential matches. Various methods can be used to determine which of these potential matches is correct, and whether the match is sufficiently precise to properly identify the tag and the article to which it is attached. In the following paragraphs, one example of a method for comparing the set of features obtained from the images of a pattern to database records is disclosed, although it should be appreciated that other methods can also be used.

In some embodiments, a hierarchical comparison can be performed between the set of features obtained by image analysis for a pattern's tag and database records to identify the tag. For example, with a dendrite, the comparison begins from the center or origin of a dendritic pattern, and then extends in successive steps outward from the center or origin, i.e., from high dimensional features such as trunks and major branches to low dimensional features such as minor branches and twigs. For each successive feature, only database records that also contain such a feature (as well as all of the other higher-dimensional features identified for the tag) are further considered as possible matches. That is, at the beginning of the comparison, all of the database records are considered to be possible matches to the pattern's tag. As each successive feature of the tag is analyzed, the possible list of matching database records can be reduced by eliminating records that do not include the collective list of features analyzed to that point. Thus, analyses of each successive feature typically reduce the number of records that can correspond to a possible match (so that each successive analysis reduces the number of database records that are examined).

For example, a radial dendritic structure may have several trunks originating from the center. The angles between these trunks can be determined and used as the first several "levels" in the hierarchical comparison tree (i.e., only stored records which include this set of angles would be retained for consideration at subsequent levels in the comparison tree). The next several levels in the tree can be based on features such as the distance from the center of each trunk to the first major branch. Subsequent levels can be based on features such as the angles of these branches to their respective trunks. The foregoing provides examples of features that can be used to implement different levels of the comparison tree, but more generally, any of the features extracted from the captured images can be used, in any order.

In some embodiments, "box counting" methods can be used to generate a unique identifier for a pattern that can then be compared to information in stored records for purposes of identification. Box counting methods are typically used to determine the fractal dimension of a dendritic structure, and are hierarchical in nature. In this approach, an image of the pattern is divided into square boxes arranged in a grid pattern. The grid pattern can be aligned to fiducial marks applied to the tag that contains the structure. Each box is then examined to determine whether or not it contains a portion of the pattern (e.g., a dendritic structure). The output for this examination step is binary: each box is assigned a value of zero if the box includes no portion of the pattern, and a value of 1 if the box includes a portion of the structure. Typically, in an initial scan, a fine-scale grid is used to digitize the image. Then, in subsequent pattern matching operations, a coarse-scale grid is used initially, and then the analysis is repeated with progressively finer-scale grids, e.g., halving the length of the box for each analysis step, to produce a unique data set to represent the dendritic structure. The analysis corresponding to the coarsest-scale is used to reject all the stored patterns that do not match. Subsequent finer-scale grids are used to do the same, rejecting all non-matching patterns to reduce the time it takes to complete the matching process. Thus, box counting methods implement a hierarchical analysis, just as the feature-based methods discussed above.

The rate at which comparisons to stored patterns can be performed can be significantly increased in some embodiments by eliminating regions that correspond to no dendritic structure from further consideration as finer-scale grids are used. The selective elimination of such regions from further consideration is based upon the observation that if a particular region contains no dendritic structure at a coarse scale, then that region (and portions thereof) will also contain no dendritic structure at finer scales. Accordingly, such regions can be eliminated from further consideration at successively finer scales, which can significantly reduce analysis time at later levels of the hierarchical analysis scheme.

The comparison between identified features of the tag and database records, or the binary box counting analysis and database records, proceeds until all the non-conforming records are rejected and only one possible match remains. Since the dendritic structures are fractal in nature, this process is primarily limited by the magnification of the image acquisition optics: the higher the magnification used, the greater the number of features (and therefore, levels in the hierarchical comparison tree) as smaller and smaller features toward the ends of each branch can be included in the analysis. In general, the information density from the analysis increases according to the fractal dimension of the pattern.

If the comparison results in no matches between the feature set corresponding to the tag and the database records, in certain embodiments the comparison between the feature set and the database records can be repeated, with relaxed measurement tolerances to obtain a match. In some embodiments, the device used to perform the comparison can prompt the user to re-scan the pattern's tag to obtain a new set of images, which can then be used to repeat the feature set analysis and comparison to database records. The new set of images can also be used to reduce measurement and/or acquisition errors in the original set of tag images, e.g., by combining the images to reduce noise and/or aberrations. As an example, the fractal nature of some patterns allows defects in the acquired images to be rejected, as the line segments should be continuous and branching so that gaps and isolated truncated points can be ignored during the feature set analysis and subsequent comparison to database records. Captured image blurring can be compensated by the thinning process described above (e.g., by replacing the acquired image with line segments). Scale or magnification distortions can be overcome using Scale Invariant Feature Transform methods, as described above.

If the comparison is repeated and no matches are once again found between the feature set corresponding to the tag and the database records, the device can issue a warning (e.g., a visual and/or auditory message or alert) that the tag could not be properly identified, and may not be genuine.

If the comparison produces more than one possible match between the tag's feature set and the database records, then in some embodiments, the comparison can be repeated with tighter measurement tolerances to produce a more accurate match. In certain embodiments, the device used to perform the comparison can prompt the user to re-scan the pattern's tag to obtain a new set of images, which can then be used to repeat the feature set analysis and comparison to database records. The new images can also be combined with the previous images to reduce measurement and/or acquisition errors: the combined image information can then be used for the second comparison.

If multiple potential matches remain following the second comparison (and, possibly, additional subsequent comparisons), further information can be used to distinguish among the potential matches. In some embodiments, for example, contextual information can be used. Tags can be applied to a wide variety of different articles, and database records can include information relating not only to the features of the patterns in the tags, but also to the articles to which the tags are applied. This contextual information can be used to distinguish among potential matches.

For example, suppose that two database records correspond to potential matches for a pattern's tag, but the first record includes information indicating that it corresponds to a tag applied to one type of article such as a pharmaceutical product, while the second record includes information indicating that it corresponds to a tag applied to a different type of article such as a meat product. If the tag that is being identified is attached to a pharmaceutical product, this contextual information can be used to readily identify the first record as a match, and to reject the second record.

In addition, information obtained from reflected light images can also be used to distinguish among multiple possible database records. As described above, reflected light images that correspond to different illumination directions and/or different illumination wavelengths produce distinctive reflected light profiles from the patterns. Information derived from images of these profiles (and/or the images themselves) can be stored in database records and used to distinguish among records having feature sets that nominally each correspond to the feature set of a pattern's tag that is subject to identification.

In the foregoing discussion, contextual and information from the reflected light profile are used to distinguish among possible database record matches after the hierarchical comparison has been performed. More generally, however, this additional information can be incorporated at any level into the hierarchical comparison to filter out possible matches from among the database records. For example, in some embodiments, this additional information can be used at the first level, or at one of the first five levels, of the hierarchical comparison. In certain embodiments, using contextual and/or reflected light information early in the hierarchical comparison can significantly reduce the number of database records that are considered at subsequent levels.

Following the comparison, the tag is either identified as genuine, or identification is deemed impossible, and the procedure ends. In either case, a message can be delivered to the user of the imaging device via a display screen. The user may be given the option of re-scanning the pattern's tag to attempt identification again.

In some embodiments, the set of features associated with analyzed image(s) of the pattern's tag can be stored in the database and marked as a record corresponding to an unknown and/or potential counterfeit article. Various criteria can be used for determining whether marking of the set of features should occur in the database. For example, the failure to produce any matches in the early levels of the hierarchical comparison is much less likely to be due to measurement/digitization errors and so is more likely to indicate a counterfeit tag, whereas such a failure in the advanced levels of the comparison could be due to measurement errors. Thus, records can be marked according to the first level at which no match between the tag's feature set and the database records occurs, with a threshold level value (e.g., 2 or 3) to establish whether the record is marked as a likely counterfeit. Records can be marked with a variety of information, including the date and/or location of the most recent comparison to other database records, the first level at which no match occurred between the tag's feature set and the other records, and the likely or suspected reason for the failure to match any records. By marking the record corresponding to the extracted feature set as corresponding to an unknown and/or potential counterfeit article, subsequent scans of the same tag can rapidly alert the user of the scanning device that the tagged article is suspect.

Unique Stochastically Branching Patterns

As described herein, "multi-fluid dendrites" generally refer to unique stochastically branching patterns fabricated by sandwiching a first fluid as a thin layer between two surfaces and then introducing a second fluid having a lower viscosity than the first fluid between the two surfaces. The surfaces can be planar or curved. Examples of suitable surface materials include glass and plastic (e.g., polyethylene terephthalate). In some embodiments, one of the surfaces is a label, a package, or any other item for which authentication is desirable. Features in one or more of the two surfaces (e.g., defects/pits/grooves) typically promote more branching at the edges of the dendritic fingers. Surface irregularities can overcome the surface tension smoothing effect and allow small branches to grow. Regular shapes in one or more of the two surfaces can force branching to occur in a symmetric way if desired.

The unique stochastically branching (e.g., dendritic) structures described herein can be fabricated by providing a first fluid between a surface of a first substrate and a surface of a second substrate, and introducing a second fluid between the surface of the substrate and the surface of the second substrate. The first substrate can be an item (e.g., a piece of produce or a consumer good). In some cases, the first substrate is a label (e.g., a produce label) or packaging. Suitable materials for the first and second substrates include glass, plastic (e.g., polyethylene terephthalate), metal (e.g., stainless steel), synthetic paper, and resin-coated paper. The first substrate, the second substrate, or both can be flexible (including stretchable) or rigid. The surface of the first substrate and the surface of the second substrate can be curved or substantially planar. In some cases, the surface of the first substrate, the surface of the second substrate, or both have a root mean square surface roughness of about 50 µm or less (e.g., for metals) or about 1 µm or less (e.g., for plastics). In some cases, the surface of the first substrate, the second substrate, or both have protrusions, recessions, or both. The first fluid may be in direct contact with the protrusions, the recessions, or both. In some cases, the protrusions and recessions form repeating features in the surface of the first substrate, the second substrate, or both.

Providing the first fluid between the first substrate and the second substrate can include disposing the first fluid on the surface of the first substrate and contacting the first fluid with the surface of the second substrate. The first fluid can be spread on the surface of the first substrate before introducing the second fluid. In some cases, the first fluid is in direct contact with the surface of the first substrate and the surface of the second substrate. In certain cases, the surface of the first substrate, the surface of the second substrate, or both have been treated (e.g., etched with an acid or base) or coated (e.g., with an adhesive material) before the first fluid contacts the surface of the first substrate.

Disposing the first fluid on the surface of the first substrate can include dispensing the first fluid from a nozzle or through a template to yield one or more drops of the first fluid on the surface of the first substrate. The drops typically have a volume of a few microliters (e.g., about 2 µL) to a few hundred microliters (e.g., about 400 µL). The nozzle can be driven by pressure pulses. In some cases, when the nozzle is part of an inkjet head, the nozzle can be driven by a piezo-electric mechanism. A suitable template defines openings sized and positioned to form droplets of a selected volume and spacing. In some cases, the first fluid is deposited in a pattern on the surface of the first substrate with a rotogravure. Disposing the first fluid on the surface of the first substrate can include disposing a single drop or a multiplicity of drops of the first fluid on the surface of the substrate. The drops can be sized and spaced such that the resulting dendritic structures are discrete or contact (e.g., grow into) each other to yield a continuous array of dendritic structures.

The surface of the first substrate and the surface of the second substrate at least partially confine the first fluid, and the surface of the first substrate and the surface of the second substrate are separated by the first fluid at a region between the surface of the first substrate and the surface of the second substrate, thereby allowing the second fluid to penetrate the first fluid at the region. Introducing the second fluid between the surface of the first substrate and the surface of the second substrate can include injecting the second fluid under pressure between the surface of the first substrate and the surface of the second substrate. In some cases, the first substrate and the second substrate (with the first fluid therebetween) is submerged in the second fluid (e.g., air).

Separating the first substrate and the second substrate can be achieved by increasing a distance between an edge of the first substrate and an edge of the second substrate such that the region translates away from the first edge of the first substrate and the first edge of the second substrate. After the second fluid is introduced between the surface of the first substrate and the surface of the second substrate and penetrates the first fluid, the second fluid is in direct contact with the first fluid. At the temperature at which the dendritic structure is formed (the "formation temperature"), a viscosity of the first fluid exceeds a viscosity of the second fluid. In some cases, the formation temperature is room temperature (e.g., around 20° C. to 28° C.). Separating the first substrate and the second substrate results in the formation of a unique stochastically branching pattern (a dendritic structure) from the first fluid on the surface of the first substrate. A mirror image of the stochastically branching pattern on the surface of the first substrate is formed from the first fluid on the surface of the second substrate. The dendritic structures on the first substrate and the second substrate are identical in shape (e.g., outline) and can differ, for example, in height or other physical properties due at least in part to inhomogeneous distribution of any particles that may be in the dendritic structures.

The dendritic structures on the first substrate, the second substrate, or both can be solidified to yield dendritic structures having a maximum dimension in a range of about 5 mm to about 5 cm. Methods of drying include evaporation of a solvent (e.g., water) in the first fluid, hardening the first fluid via a hardener, curing the first fluid with ultraviolet radiation, crystallizing the first fluid, and freezing the first fluid.

In one example, the first fluid is an emulsion of acrylic polymer particles in water. A surfactant is typically used to keep the particles suspended. The emulsion is a clear viscous fluid that can be mixed with pigment to give it a tint (transparent) or deep color (opaque). The first fluid solidifies by the evaporation of water and the "fusing" of the particles when they contact each other. The resulting material has microscopic gaps between the fused particles which trap the pigment particles. This structure can also be used for trapping functional materials that react to light, radiation, heat, chemicals, biological elements, etc.

In another example, the first fluid includes a hardener and monomers, oligomers, polymeric particles, or a combination thereof. The hardener chemically fuses the polymeric particles together or polymerizes the monomers or oligomers. Suitable hardeners include amines (e.g., aliphatic amines, amine adducts, amine terminated polyamides). Two part (resin+hardener) systems solidify quickly and result in a solid/less porous material that is resistant to abrasion, moisture, and chemical attack. These dendritic structures can be used in harsh environments. Steel reinforced epoxy is a one example of this type of dendritic structure, as the resin binds strongly to the metal particles as well as to itself, forming a strong material that is resistant to mechanical forces and heat.

In yet another example, the first fluid includes UV curable resins. UV curable resins can include epoxy monomers that are polymerized by a photo-initiator under exposure to ultraviolet light. The dendritic structure solidifies quickly under UV illumination, with a short, controllable curing time.

In yet another example, a dendritic structure is solidified by crystallization. First fluids suitable for crystallization include honey and other sugar solutions (e.g., syrups). Crystallization can be achieved by heating after formation of the dendritic structure to promote crystallization.

In yet another example, solidification can be achieved by cooling (e.g., freezing) a dendritic structure from an elevated temperature. A suitable first fluid includes carnauba wax at a temperature of about 50-60° C. Subsequent cooling to room temperature results in solidification of the dendritic structure. In addition to carnauba wax, first fluids that include shellac and beeswax can also be solidified by cooling.

Figure 6:
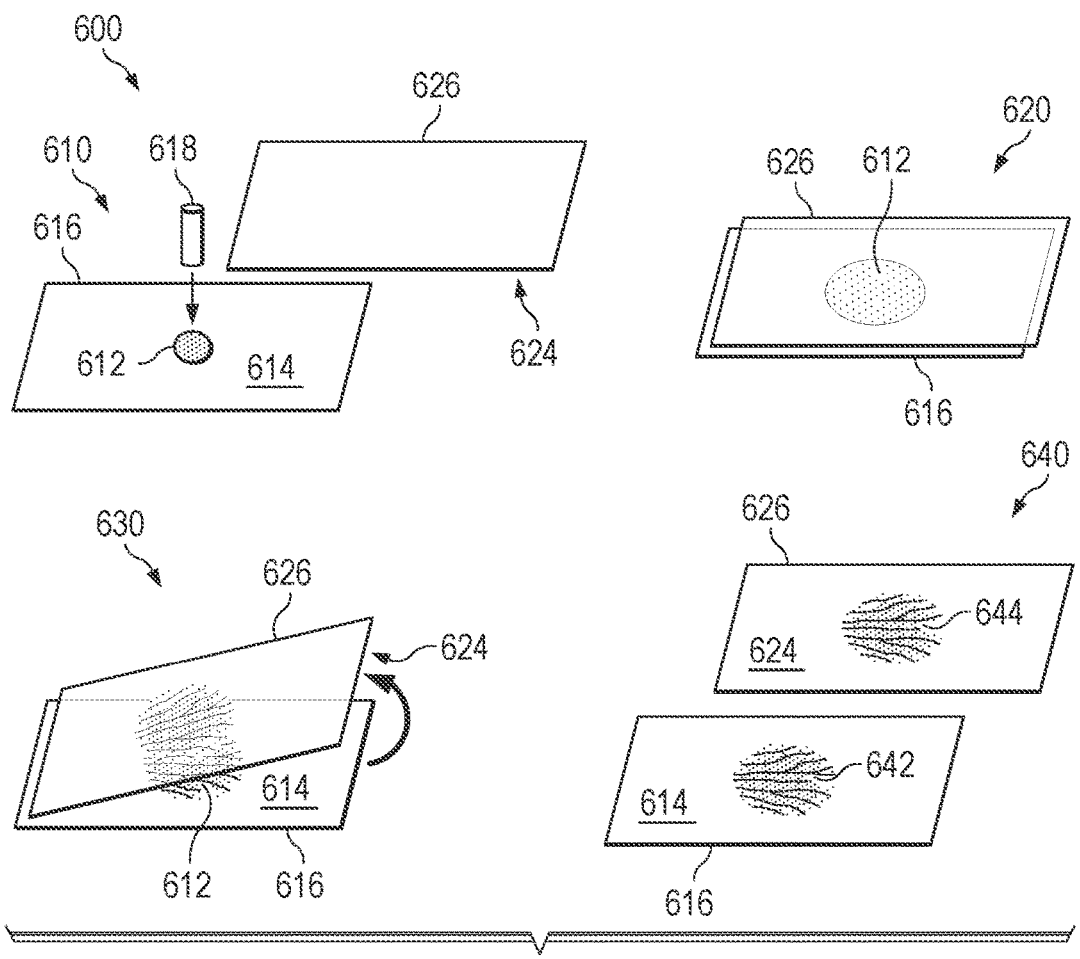
FIG. 6 depicts multi-fluid dendrite formation by interaction of fluids between two substrates.

FIG. 6 depicts process 600 for fabricating dendritic structures. In 610, first fluid 612 is disposed on surface 614 of first substrate 616 with nozzle 618. In 620, first fluid 612 is contacted with surface 624 of second substrate 626, and the first fluid spreads between surface 614 of first substrate 616 and surface 624 of second substrate 626. Surface 614 of first substrate 616 and surface 624 of second substrate 626 at least partially confine first fluid 612, and surface 614 of first substrate 616 and surface 624 of second substrate 626 are separated by first fluid 612 at a region between surface 614 of first substrate 616 and surface 624 of second substrate 626. In 630, first substrate 616 and second substrate 626 are separated (i.e., the distance between surface 614 of first substrate 616 and surface 624 of second substrate 626 is increased), thereby allowing the second fluid (e.g., air) to penetrate first fluid 612 at the region, such that the second fluid is in direct contact with first fluid 612. The temperature at which the dendritic structure is formed is referred to herein as the "formation temperature." A viscosity of first fluid 612 exceeds that of the second fluid at the formation temperature. In some cases, substrate 616 and second substrate 626 are submerged in or surrounded by the second fluid. In 640, first stochastically branched pattern 642 and second stochastically branched pattern 644 are shown on surface 614 of first substrate 616 and surface 624 of second substrate 626, respectively.

As depicted in FIG. 6, a thin layer of first (more viscous) fluid 612 is provided between surfaces 614 and 624 to form an assembly, and first fluid 612 is contacted with second (lower viscosity) fluid 624 at a first edge of the assembly such that a distance between surfaces 614 and 624 is on the order of a few microns to several hundred microns. Surfaces 614 and 624 are then separated from the first edge of the assembly to a second edge of the assembly in the presence of second fluid 622 to allow the rapid ingress of the second fluid as a distance between surfaces 614 and 624 is increased, resulting in the formation of unique stochastically branching pattern 642 on surface 614 of first substrate 616 and unique stochastically branching pattern 644 on surface 624 of first substrate 626, respectively. Surfaces 614, 624 can be substantially planar and parallel to each other. Other embodiments include orientations of surfaces 614, 624 other than substantially planar and parallel.

Figure 7:
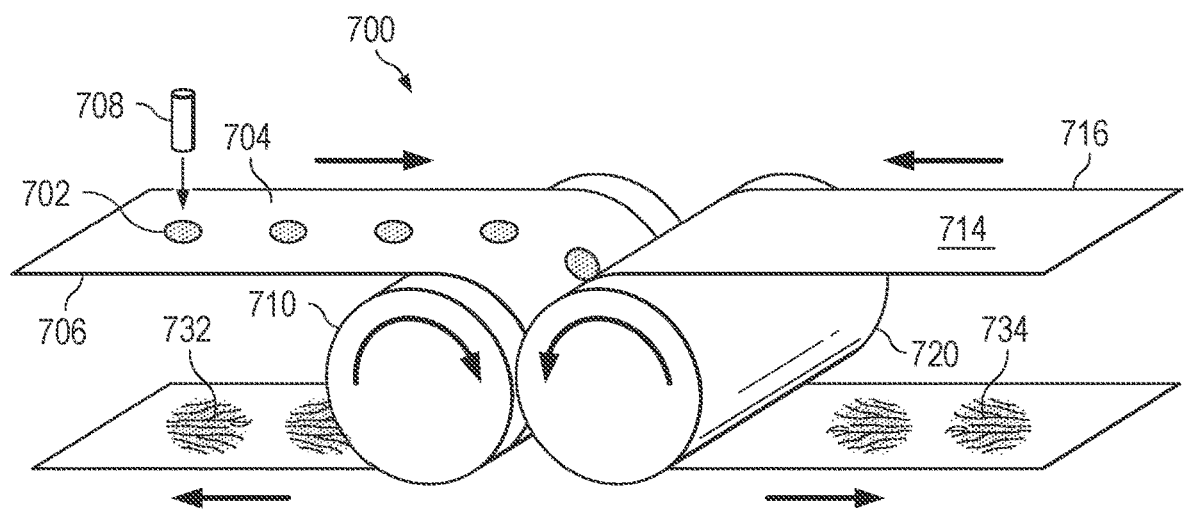
FIG. 7 depicts continuous formation of multi-fluid dendrite formation.

FIG. 7 depicts process 700 for continuous production of dendritic structures. First fluid 702 is disposed on surface 704 of first substrate 706 with nozzle 708, and first substrate 706 is advanced clockwise around first roller 710. First fluid 702 is compressed between surface 704 of first substrate 706 and surface 714 of second substrate 716 as first roller 710 rotates clockwise and second roller 720 rotates counterclockwise. Substrates 706, 716 can be subjected to pressure in a range of about 50 g to about 5 kg between rollers 710, 720 (e.g., at a location where roller 710 contacts roller 720). As first substrate 706 and second substrate 716 advance about rollers 710 and 720, surface 704 and surface 714 are separated, yielding first stochastically branched pattern 732 on surface 704 of first substrate 706 and stochastically branched pattern 734 on surface 714 of second substrate 716.

In process 700, first fluid 702 is typically disposed on first substrate 704 in droplet sizes in a range of about 2 µL to about 400 µL. The droplets can be disposed on first substrate 704 in a line or in an array. A spacing between the droplets can be selected such that the resulting dendritic structures are discrete (e.g., discrete dendritic structures in a one-dimensional or two-dimensional array) or are continuous (e.g., intergrown dendritic structures). The directionality of pressure application as substrates 706, 716 advance through rollers 710, 720 results in a growth pattern with branches in a limited angular orientation. In some cases, the branches are arranged within an arc of about 120°, about 110°, about 100° arc, or about 90° centered at a base of the dendritic structure.

Dendritic structures formed by the manual process depicted in FIG. 6 typically have a ridge height (distance from the surface of the substrate to the highest point on the dendritic structure, measured perpendicular to the surface of the substrate) greater than that of dendritic structures formed by the continuous process depicted in FIG. 7. This difference can be attributed at least in part to the greater pressure applied to the first fluid in the continuous process.

In embodiments depicted in FIGS. 6 and 7 as well as other embodiments, the first fluid can include a gel, an oil, a polymer (e.g., a solubilized polymer or an emulsion of polymer particles in a solvent), or polymerizable monomers (e.g., (meth)acrylate monomers). The first fluid can be solidified (e.g., dried or cured) by evaporation of the solvent or exposure to air or light (e.g., UV radiation). In some cases, the first fluid includes a hardener (e.g., a free radical initiator or a photoinitiator). Suitable first fluids include acrylic paint media and steel-reinforced acrylic. In one example, acrylic paint media is an emulsion of acrylic resin particles in a solvent (e.g., water). In some cases, the emulsion includes one or more additional types of polymeric particles. The acrylic resin and other polymer particles are generally insoluble in water. The emulsion typically includes one or more pigments and surfactants. As the water evaporates after formation of the dendritic structure, the polymeric particles are drawn closer, until they touch and fuse together. This coalescence and produces a honeycomb-like pattern. Pigment particles are trapped in the honeycomb pattern, producing a viscoelastic paint film that is highly flexible with great adhesion. The elasticity of a multi-fluid dendrite can be reduced by altering the composition of an emulsion used to make the dendrite (e.g., by adding a hardener) or by annealing the dendrite to melt the polymeric particles and thus further fuse the particles together.

In some cases, the first fluid is food safe. Examples of suitable food-safe materials include Generally Recognized as Safe (GRAS) substances, such as glycerin, gelatin, wax, and polyvinyl alcohol.

The first fluid can be selected to have a contact angle on the surface of the first substrate in a range of 60° to 70°. In some cases, the first fluid is colorless. In certain cases, the first fluid can include a colorant to enhance visibility of the dendritic structure. In some cases, the first fluid is optically transparent. In some cases, the first fluid includes a fluorescent substance that fluoresces when irradiated with light (e.g., ultraviolet light). The first fluid can be electrically conductive or non-conductive.

Particulate matter can be combined with the first fluid prior to deposition or on the uncured first fluid after dendrite formation. The particulate matter can be in forms such as flakes or crystals. The particulate matter can be electrically conductive (e.g., metallic) or non-conductive. Examples of food-safe, non-conductive particles include crystals of sugar, salt, gelatin, or the like. A size of the particulate matter is typically in a range of about 1 µm to about 400 µm. In some cases, the particulate matter includes nanoscale aggregates. A density of the particulate matter in the first fluid (e.g., number of particles per microliter of fluid) is typically in a range of 10 to 50,000.

Examples of suitable second fluids include air or other gasses, organic solvents (e.g., acetone, hexane, and alcohols such as methanol, ethanol, and isopropanol), and penetrating oils (e.g., WD-40). The second fluid can be optically transparent. In some cases, the second fluid includes a colorant. The colorant may be the same as or different than a colorant present in the first fluid.

The first fluid, the second fluid, or both can independently include a colorant. In some cases, the first fluid, the second fluid, or both include a surfactant (e.g., detergent) to reduce surface tension. The first fluid can be a mixture of two or more fluids, and the second fluid can independently be a mixture of two or more second fluids, or both. The two or more fluids may be mixed to form a homogenous fluid before use.

The first and second fluids are typically selected to have a low interfacial tension (e.g., less than about 40 mJ/m$^2$). This limits the inhibition of small branches due to surface tension effects. A variety of dendritic morphologies can be created, based at least in part on properties of the first and second fluids and the rate of separation of the two surfaces (e.g., about 0.1 cm/s to about 250 cm/s). The rate of separation of the surfaces is a factor in dendrite morphology, with slower separation (less than about 1 cm/s) leading to denser patterns (high fractal dimension, greater than about 1.5) and patterns that are more irregular (more like "diffusion limited aggregates" in shape).

In some cases, the first fluid has a viscosity in a range of about 0.5 Pa·s to about 10 Pa·s at room temperature. The viscosity of the first fluid is typically at least about 100 times greater than the viscosity of the second fluid at the formation temperature. The resulting dendritic structures have a high information density (i.e., a vast number of possible versions), and can be "read" (identified) with appropriate algorithms.

In general, a first fluid in the higher range of viscosity (greater than about 1 Pa·s) yields a three-dimensional dendritic structure with a variable thickness with respect to the surface on which it is formed. This variable thickness can be detected using low angle illumination, which will light up facets that are facing the light source to create bright features in the image. Different illumination directions will light up different facets, so the presence of a three dimensional pattern (rather than a two dimensional pattern) is apparent. The way that the first fluid separates when a distance between the surface of the first substrate and the surface of the second substrate are separated can also lead to unique topography in each pair of dendrites. That is, there can be subtle thickness variations along the length of each branch, increasing the difficulty of cloning of these patterns.

Dendritic structures fabricated as described herein can be functionalized by including one or more additives in the first fluid, and attaching the dendritic structure as a label on an item (e.g., produce, pharmaceuticals, etc.). In one example, an additive that changes color irreversibly when a particular temperature is exceeded can be used as an indicator that a cold chain has been broken. In another example, an additive that changes color irreversibly when the dendritic structure is exposed to light (e.g., for a selected length of time or at a selected wavelength) can be used as an indicator of exposure to light. Other additives include additives that change color irreversibly when the dendritic structure is exposed to water or a threshold humidity level, a selected type of radiation (e.g., gamma radiation, X-rays, etc.), specific chemicals (e.g., chorine), or biological agents (e.g., bacteria such as *E. coli*).

Authenticating a stochastically branching pattern formed by processes described herein can include measuring a height of each point of a first multiplicity of points on a first stochastically branching pattern from a surface from which the first stochastically branching pattern extends, comparing the height of each of the first multiplicity of points with a height of each of a second multiplicity of corresponding points on a second stochastically branching pattern, and assessing a difference in height between each corresponding point of the first multiplicity of points and the second multiplicity of points. In some cases, authenticating a stochastically branching pattern, the method includes assessing an optical signal from a stochastically branching pattern that contains reflective particles.

Stochastically branching patterns also have natural anti-tamper qualities. For multi-fluid dendrites formed of viscoelastic polymers (e.g., include amorphous polymers, semicrystalline polymers, and biopolymers), the dendrites retain their shape through normal flexing during use, but typically distort when stretched. In one example, an acrylic multi-fluid dendrite might maintain its shape during the slight vertical movement of a label on a produce item during transport and handling, but distort if the label is peeled off the produce item. The distortion during removal of the label may result in permanent lengthening of dendrite features along a particular axis. If the label is reused, this damage would be visible during subsequent inspection, especially when the tampered version is compared with the original image. The presence of scattering centers in the form of metal or other reflective particles, distances between the particles will change if the acrylic (or other medium) is stretched, which can be detected optically. Damage sustained during tearing or stretching is evident in the polarized light image, as well as the geometric distortion of the dendrite, providing multiple methods of detection.

These distortions will be most detectible during optical inspection (with unpolarized and polarized light). Feature-by-feature comparison with the original (undistorted) pattern can be used to detect such damage. In addition, machine learning (ML) can be used to train a system to recognize distortions caused by illicit breaking or removal. In this approach, two training sets, images of undistorted and distorted dendrites, can be used to define the parameters for system operation, so that a neural network can automatically detect and flag tampering issues.

Hardware and Software Implementation

The algorithmic and method steps disclosed herein in connection with obtaining images of pattern's tags, analyzing the images, authenticating and identifying articles to which such tags are attached, and controlling various aspects and operating parameters of devices that obtain tag images and devices that utilize such tags, can be implemented in computer programs using standard programming techniques. Such programs are designed to execute on control units, programmable computers, and/or specifically designed integrated circuits, each comprising an electronic processor, a data storage system (including memory and/or storage elements), at least one input device, and least one output device, such as a display or printer. The program code is applied to input data to perform the functions described herein and generate output information, which is applied to one or more output devices, such as a user interface that includes a display device. Each such computer program can be implemented in a high-level procedural or object-oriented programming language, or an assembly or machine language. Furthermore, the language can be a compiled or interpreted language. Each such computer program can be stored on a tangible, computer readable storage medium that, when read by a computer or other device, can cause the processor to perform the analysis and control functions described herein.

Figure 8:
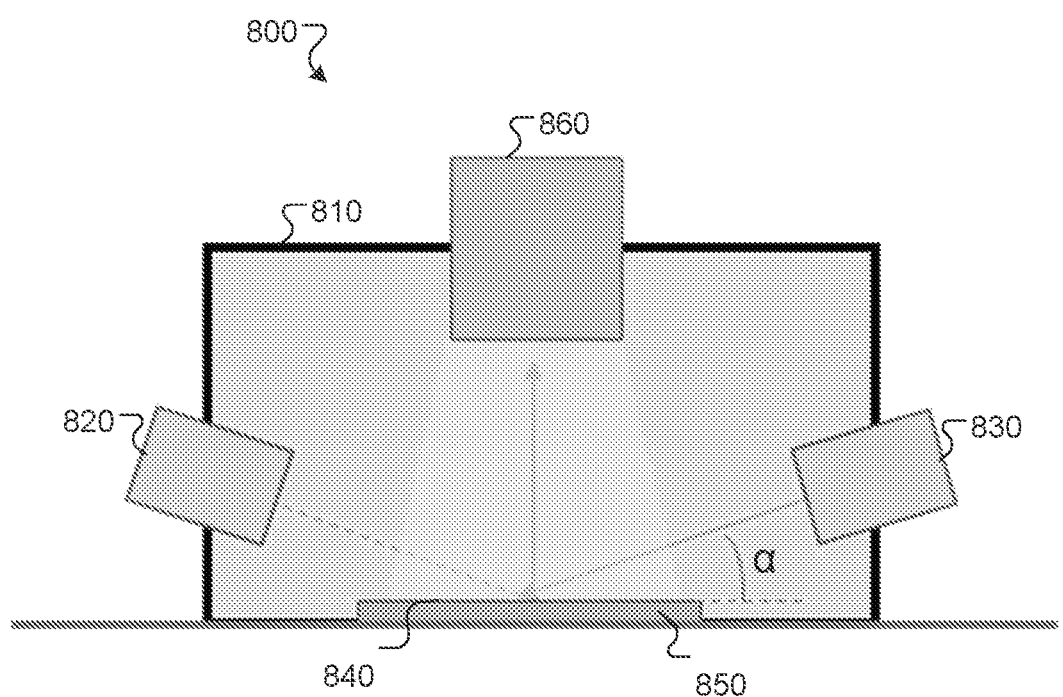
FIG. 8 depicts an apparatus for performing sequential illumination of a pattern.

In some implementations, an apparatus 800 that provides sequential illumination from multiple directions for a fixed camera position can perform an identification or an authentication method, as depicted in FIG. 8. This approach can be useful, for example, when small patterns (e.g., on the order of a few mm in diameter or less) are read and authenticated using a microscope in an industrial setting with a high degree of control and accuracy.

To reduce background illumination, an enclosure 810 can block ambient light. Illuminators 820 and 830 can illuminate a pattern 840 on a substrate 850 from different angles, e.g., "east" and "west". Illuminators 820 and 830 can sequentially illuminate the pattern 840, allowing the camera 860 to capture an image of the pattern 840 illuminated from different illumination angles α with respect to the plane of the substrate. Each image can provide a unique "constellation," or profile of reflective surfaces embedded on or in the pattern that appear based on the relative orientation of the camera, illuminator, and pattern on the substrate.

The patterns of light scattered by the particles (the constellations) are a subset thereof can be referred to as indicia. One way of creating or using the indicia would be to map a set of the brightest points of reflected light within an image (or portion of an image) taken at a particular alignment (position/angles), giving each point coordinates (e.g., pixel position), and then comparing these coordinates with the reference set of coordinates taken at the same alignment.

The camera 860 can be a USB microscope with its own flood illumination source to allow pattern alignment with the camera and pattern reading. The illuminators 820 and 830 for the identification or authentication function can be set at a fixed angle from the image plane and at multiple azimuthal positions in an enclosure 810 that can supply mechanical support for the components and block ambient light. Although apparatus 800 is depicted with two illuminators, in other embodiments the apparatus can include one or any number of illuminators, each independently positioned and angled with respect to pattern 840 or substrate 850.

During the authentication process, the camera 860 with flood illumination can be used to align and capture the pattern 840. The illuminators 820 and 830 sequentially illuminate the pattern 840, while flood illumination is turned off. Scattered light creates the constellations, which can be compared to reference images and or patterns that are taken before the pattern enters the supply by a system with the same geometry. A substantial match between the constellations produced at multiple azimuthal positions can be an indication of pattern identity or an authentic pattern.

An example process of sequentially illuminating a pattern to generate unique constellations is depicted in FIGS. 9A-9E. The pattern can be an acrylic dendritic structure containing metal flakes, with an example size distribution 5-60 μm, formed on a transparent acetate substrate. If the thickness of the pattern is slightly greater than 10 μm, the smaller flakes can rest at a large angular range and thereby reflect light into the camera from illuminators set at a low angle to the plane of the pattern as well as from high angle illuminators.

Two illuminators can be set at +90° and −90° azimuths (west and east) from the long axis of the pattern and 20° from the image plane. Low illumination angles can help avoid unwanted reflections from the substrate. An example pattern 900, such as that depicted in FIG. 9A, can be authenticated. A microscope camera can capture an area of the total pattern, marked with a box 910 in FIG. 9B. In some implementations, the box can be approximately 5.5 mm long.

Illumination from the +90° (west) source can yield a raw image of the pattern, FIG. 9C. The raw image can be quite dim, as most of the light from the low angle illuminator does not enter the camera. Consequently, the flakes that are in the best position to scatter the light into the camera will create constellations of bright spots 920.

In some implementations, comparing the images corresponding to a reduced area of the pattern is sufficient for authentication. FIG. 9D illustrates the initial capture area with a dashed box 930) and a reduced area to be magnified with a solid box 932. In some implementations, the magnified area can be an approximately 2.3 mm square. The magnified area can be contrast adjusted to better show constellation 920, as depicted in FIG. 9E.

Figure 10A:
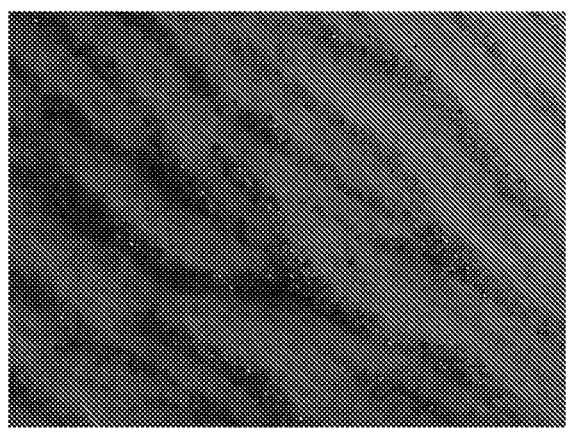
FIGS. 10A and 10B show two raw images of a pattern illuminated from two, different illumination angles.
Figure 10B:
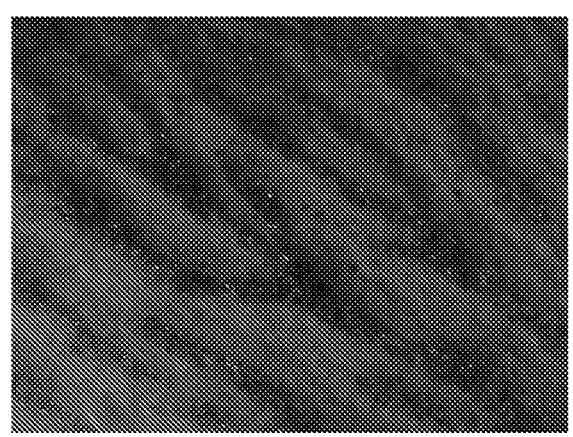

Capturing a reduced area raw image and adjusting the contrast in the magnified area can be repeated for more than one illumination direction. For example, FIGS. 10A and 10B show the raw images captured by a microscope camera for the +90° (west) and −90° (east) illumination directions, illustrating the different obtained constellations 1000 and 1010, respectively. The difference in the obtained constellations is even more evident in FIGS. 11A and 11B, which show adjusted and colorized images 1100 and 1110 of the constellations 1000 and 1010, respectively, in the magnified region produced by illumination from the +90° (west) and −90° (east) directions. FIGS. 11A and 11B are colorized to demonstrate that the reflective flakes can have varying colors, which can also increase the difficulty of counterfeiting the pattern.

Figure 11C:
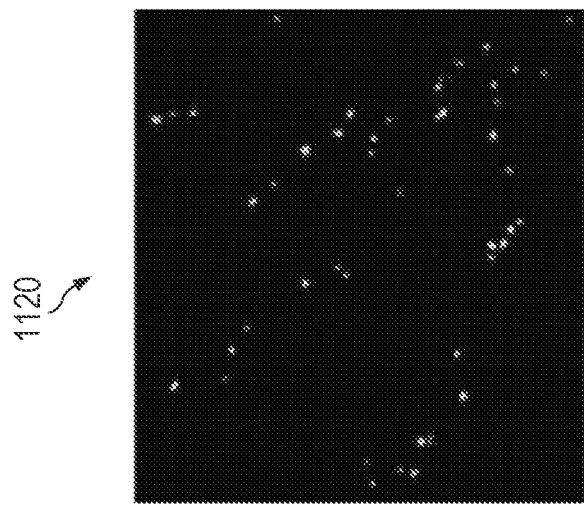
FIG. 11C shows a superposition of FIGS. 11A and 11B.
Figure 11B:
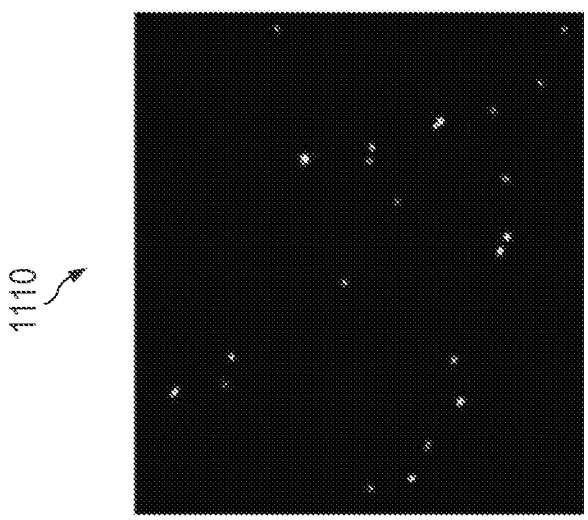
FIGS. 11A and 11B show two adjusted contrast images of a pattern from two, different illumination angles.
Figure 11A:
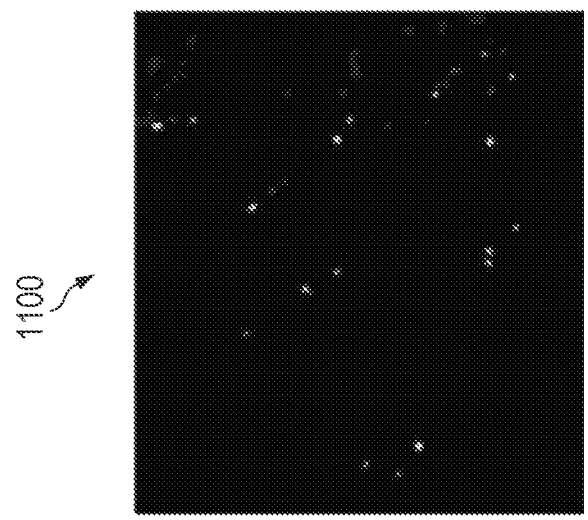

FIG. 11C shows the superposition 1120 of constellations 1100 and 1110 of FIGS. 11A and 11B, illustrating how each illumination direction can capture a different subset of reflective surfaces of the same pattern.

Figure 12C:
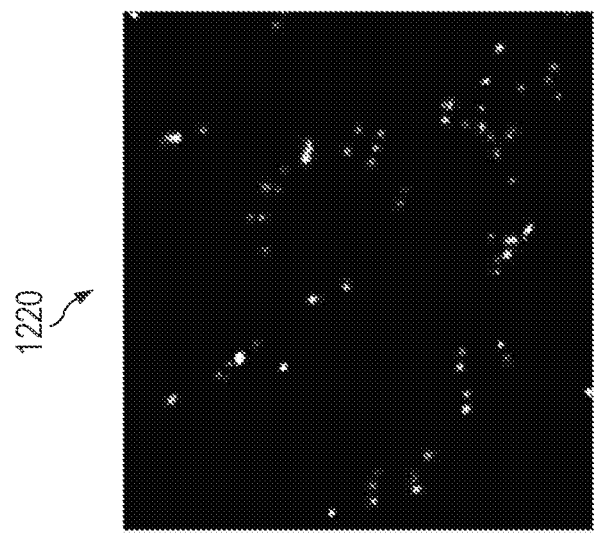
FIG. 12C shows a superposition of FIGS. 12A and 12B.
Figure 12B:
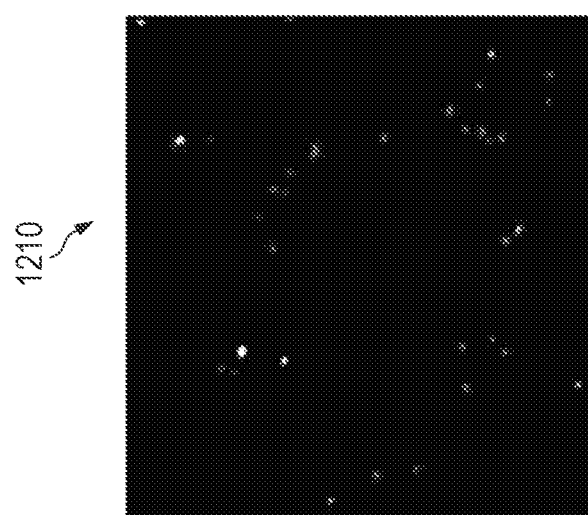
FIGS. 12A and 12B show two superpositions of adjusted contrast images of a pattern from two, different illumination angles when the camera faces the top and bottom of the substrate, respectively.
Figure 12A:
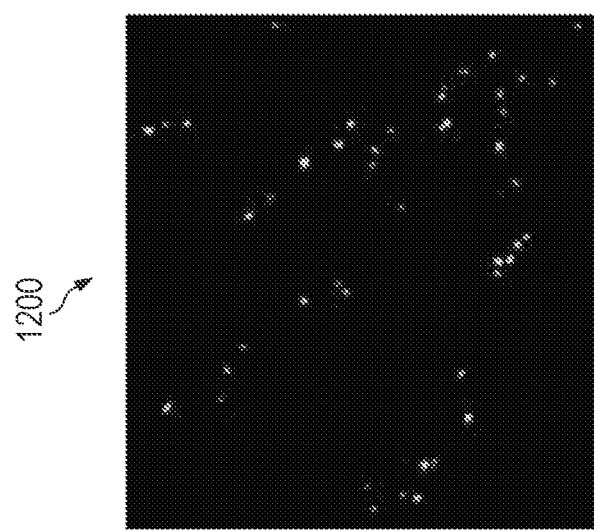

In some implementations, the substrate on or through which the pattern resides is transparent. When the substrate is transparent, identification and authentication can occur when the camera faces the top or bottom of (i.e., through) the substrate. FIGS. 12A-12C demonstrate how a different subset of reflective surfaces is captured depending on whether the camera faces the top or bottom surface of the transparent substrate. FIG. 12A, the "front constellation" 1200 is the superposition 1120 of FIG. 11C (i.e., the superposition of the contrast adjusted images of the pattern taken from different illumination angles, when the camera faces the top of the substrate). In FIG. 12B, the "rear constellation" 1210 is the superposition of the contrast adjusted images of the pattern taken from different illumination angles, when the camera faces the bottom of the substrate, but reversed to account for the opposite orientation of the pattern. The image can be reversed to obtain FIG. 12B by reflecting the superposition image along a mirror axis, which in some implementations can be a vertical edge of the superposition image. FIG. 12C is the superposition 1220 of constellations 1200 and 1210 of FIGS. 12A and 12B, demonstrating how a different subset of reflective surfaces, the front and rear constellations, can be captured for each orientation of the substrate relative to the camera.

Although an apparatus with a fixed camera and multiple illuminators have been described, other geometries are possible. Sequential illumination can be used to identify or authenticate a pattern in which the angle between a line connecting an illuminator and a pattern and a line connecting the pattern and a camera varies between two or more images.

To ensure proper alignment between the illumination source(s), the pattern, and the camera, fiducial marks may be added to or proximate to the pattern (e.g., on a substrate that supports the pattern). These marks can be used with alignment marks that appear on, for example, a cell phone screen, so that the user would be able to position the phone with its flash illuminator and camera in the correct position relative to the pattern (horizontal/x, vertical/y, distance/z, yaw/azimuth, pitch/roll/substrate angle) to reproduce the reference images. Other devices, such as a laptop or computing tablet screen, may also be used in a similar manner to align a separate illuminator-camera set-up with the pattern. The alignment may be performed manually by the user, who would line up the marks on the pattern with the marks on the screen by physically moving the phone or other illuminator-camera set-up, or moving the substrate, until the two sets of marks align. In some cases, this process could be performed automatically in an industrial setting using stepper motors controlled by a computer vision system to move the illuminator-camera set-up or substrate. In the case of a cell phone, geometric differences in the positions of the flash illuminator and camera between different cell phone models may be compensated for by adjustments to the software-provided alignment marks on the screen.

Shapes change as they are viewed from different angles. Keystoning is an example of this, where squares become trapezoids. Understanding of this phenomenon can be used to ensure proper alignment between reference and test images. In one example, using a set of features within the test pattern for alignment includes identifying a distinctive feature in the test pattern (e.g., a feature in a QR code or a part of a dendrite as described with respect to FIGS. 13A and B), recording its shape at specific alignments (positions/angles), and then using this reference shape to align with the same shape in the corresponding test image.

As far as determining whether two patterns taken at the same angles are the same, a a position comparison with thresholds can be used. Each bright point (e.g., reflected or emitted light) can be assigned a set of coordinates (e.g., in pixels in the image). Relative positions of the bright reflections in the test image can be compared to those of the reference image, both suitably aligned with the pattern. If a minimum number of the points (e.g., 100) in the test image lie within some number of pixels of the corresponding points in the reference image (e.g., within a 10 pixel radius), then the test pattern can be identified as the same as the reference pattern. In some examples, the number of matching points and position tolerance in pixels can range from 10 to 1000 and from 0 to 50 pixels, respectively. A higher required number of points can lead to a higher degree of certainty as well as more noise (missing point) sensitivity.

An advantage of using a stochastically branching pattern, e.g., a dendrite, in identification and authentication methods is that although it has approximately the same fractal dimension throughout, generally no two regions are identical. This feature of stochastically branching patterns allows a pattern to be recognized even when heavily damaged and alignment of the authentication analysis to specific areas within the pattern. Authentication by light scattering on a reduced area of the entire stochastically branching pattern can require less computation and data transfer and can generally be faster.

Figure 13B:
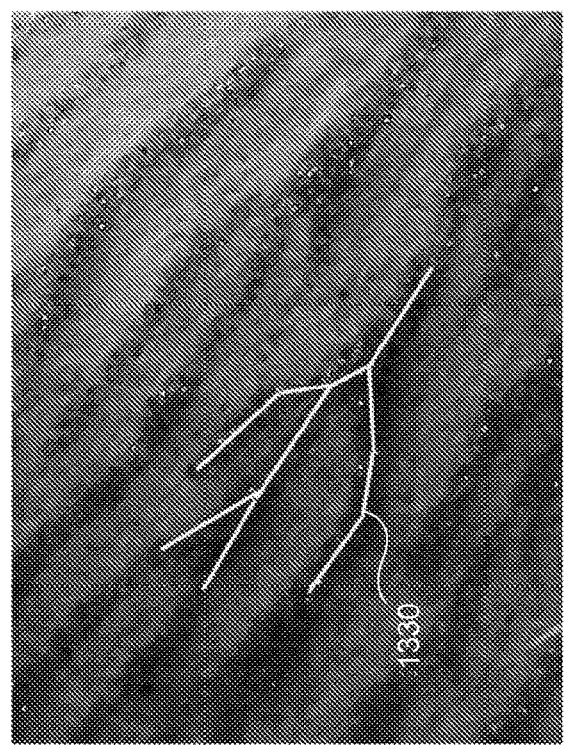
FIGS. 13A and 13B show a reduced area containing a pattern.
Figure 13A:
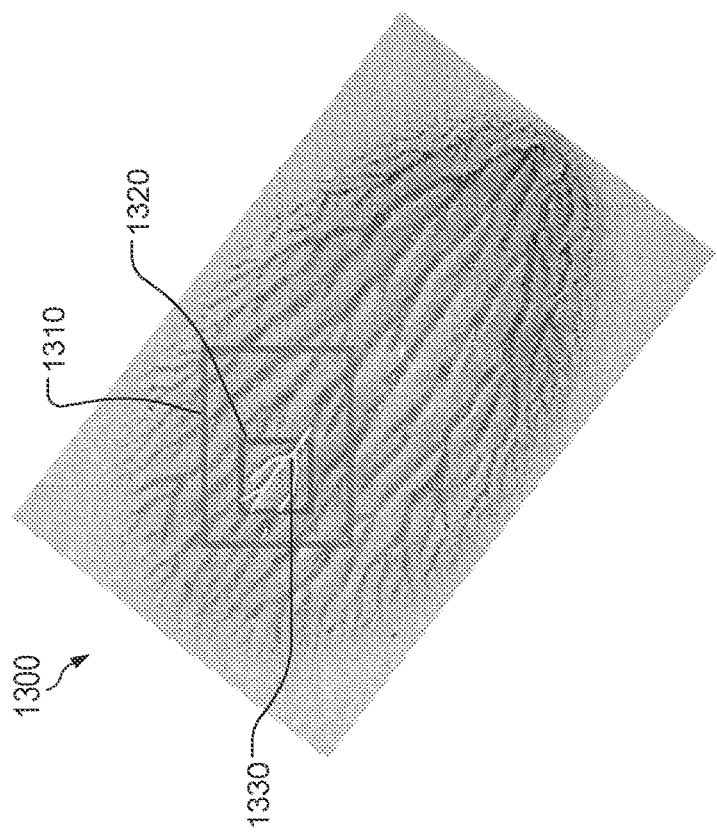

FIGS. 13A and 13B provide an example of a distinctive pattern that lies within a magnified, reduced area of a dendritic structure. FIG. 13A shows an entire dendritic structure 1300, and an area marked by first box 1310 captured by a microscope camera. A reduced area marked by a second box 1320 can be sufficient to compare to database images of the dendritic structure. The second box 1320 contains a pattern 1330, which comprises three generations of a bifurcating feature in a fractal tree. The pattern 1330 can be seen in more detail in FIG. 13B, which corresponds to the reduced area defined by the second box 1320. The pattern 1330 is unique to the overall dendritic structure and can be used to identify this particular region so that it can be used for authentication.

The cameras and illuminators from previous examples were described in the context of visible light, but other frequencies of electromagnetic radiation can be used. For example, infrared (IR) illuminators in conjunction with a camera sensitive to IR wavelengths (e.g., up to 900 nm) can illuminate and capture the pattern. Using IR wavelengths compatible illuminators and cameras can enable materials that are opaque to visible light but are transparent in the IR to be used as coatings or substrates, thereby concealing the pattern. Ultraviolet (UV) light can also be supplied by the illuminators so that particles made of fluorescent materials (e.g., calcite, fluorite, selenite) will glow strongly when illuminated.

Some implementations can limit the range of angles that the light scattering elements can take by using large diameter flakes in a relatively thin acrylic medium. The use of relatively large flakes can lead to a pattern that reflects light only when a camera is within a specific angular range, e.g., normal position to the plane of the pattern, with little or no reflection occurring beyond a critical angle that is dependent on the flake size and pattern thickness.

Figure 14:
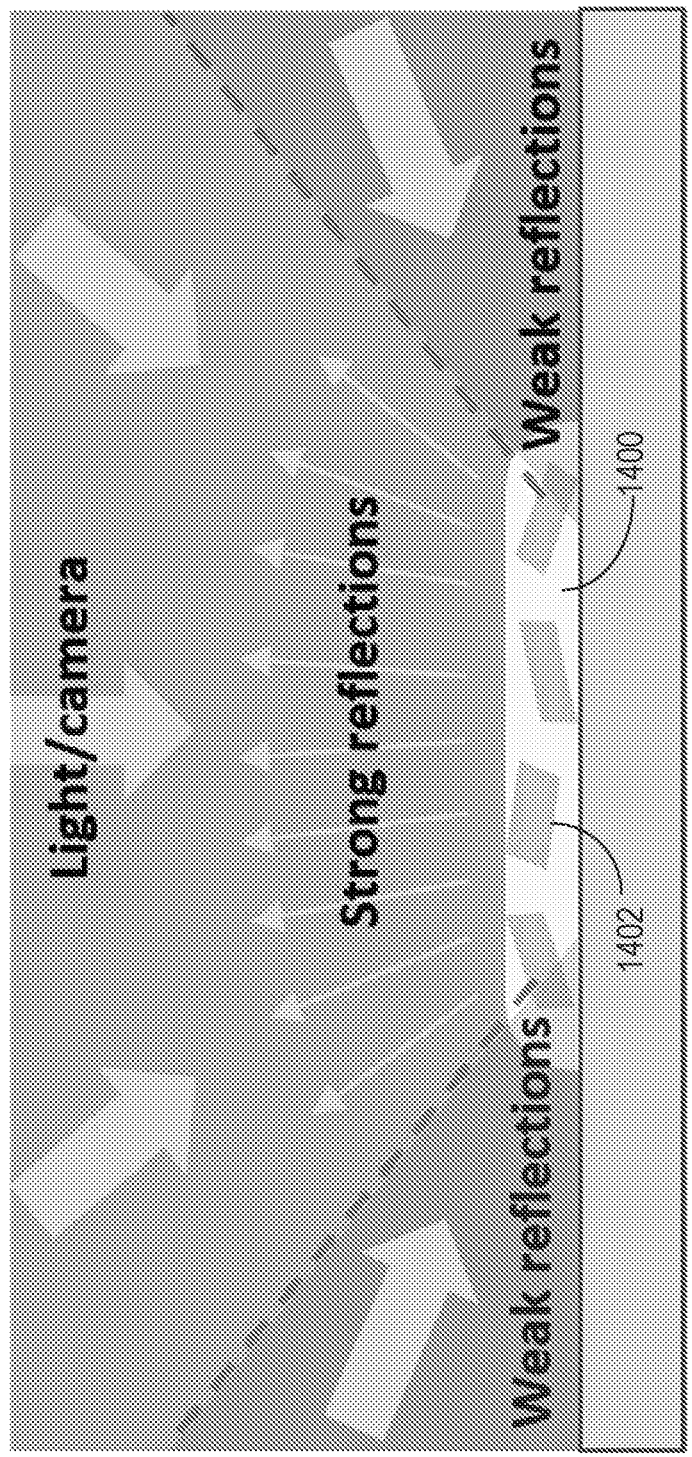
FIG. 14 illustrates how strong and weak reflections occur with relatively large reflective surfaces.

FIG. 14 illustrates how a camera will only collect strong reflections within an angular range around a light source and the camera, while light reflecting off of the reflective surfaces 1402 in pattern 1400 outside of this angular range will result in weak reflections. This approach can involve image capture at two positions-below and above the critical angle of reflection. Using only two positions can streamline the identification or authentication processes.

Figure 15C:
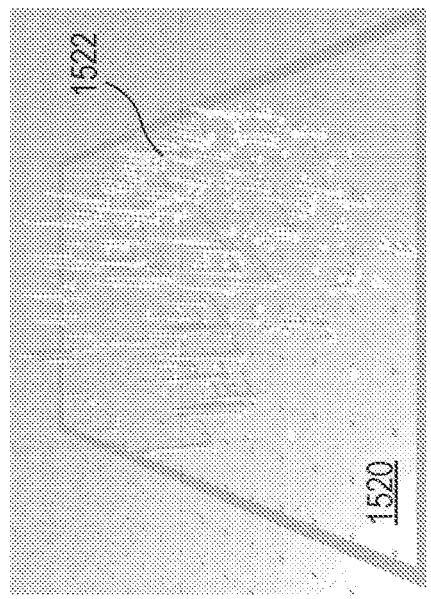
FIGS. 15A-15F demonstrate how the intensity profiles of a pattern vary with illumination angle with relatively large reflective surfaces.
Figure 15F:
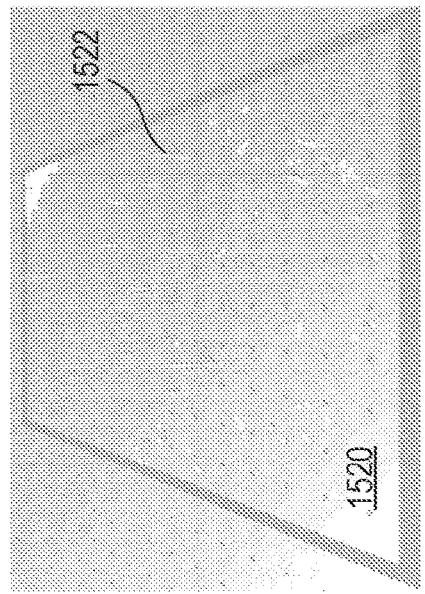
Figure 15B:
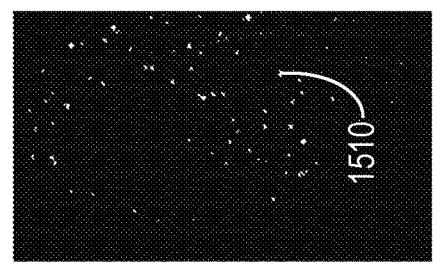
Figure 15E:
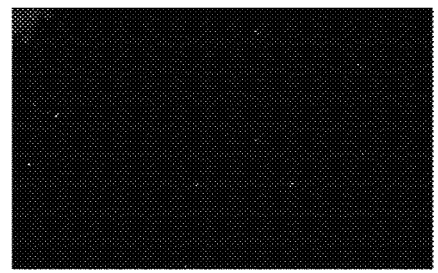
Figure 15A:
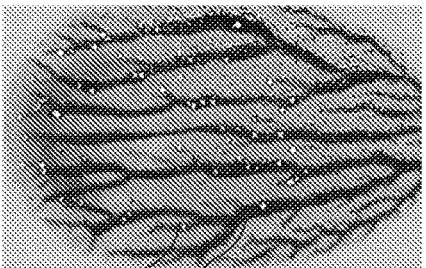
Figure 15D:
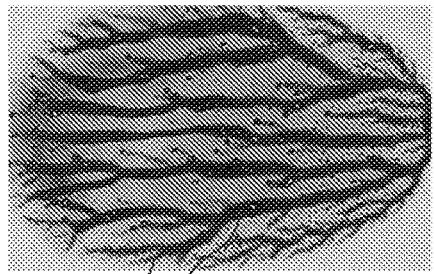

FIGS. 15A and 15D show two images of the same black tinted acrylic dendrite 1500 composed of black-tinted acrylic 1502 with several hundred metal flakes 1504 of 100 micrometer diameter embedded in the pattern. The flakes can be mixed into the liquid acrylic, such as matte acrylic medium and black acrylic paint in a 25:3 ratio, prior to dendrite formation on Avery Dennison 5663 label stock in a roller press at 1 kg force. For these formation parameters, the acrylic can be approximately 10 micrometers thick in its main branches. Consequently, the largest angle to the surface that any 100 micrometer diameter metal flake may take is $\tan^{-1}(10/100)=5.7°$.

FIGS. 15A and 15D were taken in ambient room light using a cell phone camera (Samsung Galaxy Note 20, 12 MP, f/3 telephoto lens, laser autofocus at 75 mm camera-sample separation), using the flash as the primary source for reflections. The pitch of the phone was kept constant at zero degrees (parallel to the image surface) and the roll was adjusted to produce illumination and view at 10° right (FIG. 15B), and 20° right (FIG. 15E). The pitch and roll angles were monitored using the internal position sensor and inclinometer of the phone. With the phone at a 10° roll, the metal flakes 1504 can reflect the light of the flash back into the camera lens, resulting in bright spots 1510, while avoiding substrate reflections, as seen in FIGS. 15A and 15B. As the phone rotates further, fewer flakes 1504 are in a position to reflect the light from the flash back into the camera and the bright spots 1510 fade or disappear, as seen in FIG. 15D.

The processed images of FIGS. 15A and 5D are shown in FIGS. 15B and 15C and FIGS. 15E and 15F, respectively, illustrating the powerful effect of even a slight change in illumination and or camera angle on the reflected signal. The effect of the large flake size can be visualized in FIGS. 15C and 15F, which are the result of processing FIGS. 15B and 15E, respectively. Areas not reflecting the light from the flash into the camera are considered the intensity floor 1520, and areas where the light was reflected can be considered intensity peaks 1522. Adjusting the contrast and plotting the intensity of light at each point in the two-dimensional images of FIGS. 15B and 15E yields the three-dimensional representation of intensity shown in FIGS. 15C and 15F, respectively. In FIGS. 15C and 15F, the bright spots (reflected points) appear as sharp peaks 1522 on an otherwise flat plain 1520. In this example, only 10 to 15% of the flakes that produce strong reflections at 10° produce reflections at 20°, and the peak height can be smaller in the larger roll angle case.

Figure 16:
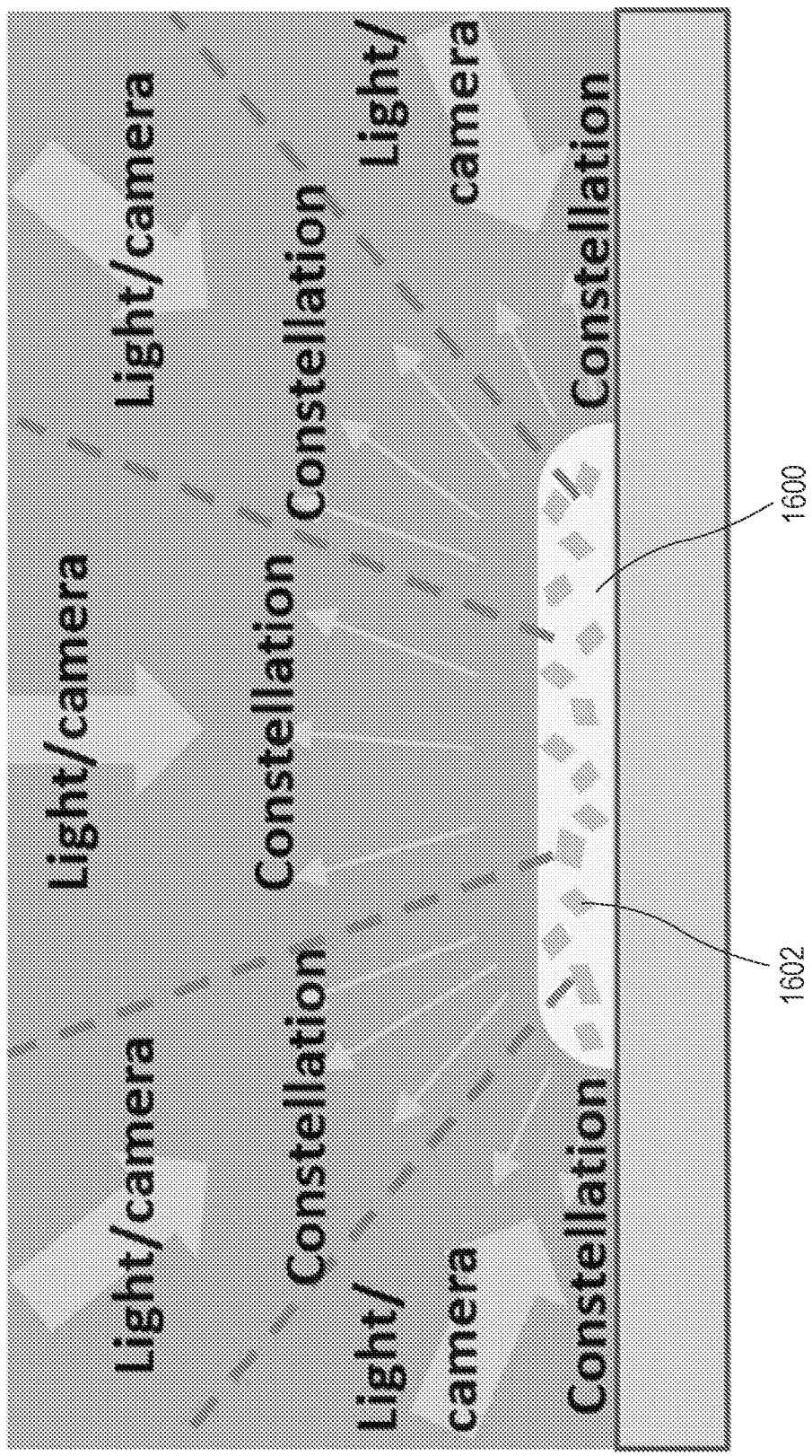
FIG. 16 illustrates numerous constellations occur with relatively small reflective surfaces.

Some implementations involve using smaller reflective surfaces that can allow a wider range of illumination angles. Referring to FIG. 16, if all or some of the small particles 1602 are on the order of the thickness of pattern 1600 (e.g., a dendrite), the scattering angles can approach 90°. A random distribution of scattering angles can produce reflections in the form of more allowed constellations, as more illumination angles are allowed.

FIGS. 17A-17F demonstrate the results of using smaller reflective surfaces. In this example, metal flakes, 5 to 60 micrometers in diameter, were added to the tinted acrylic medium, and dendrites 1700 were formed from the tinted acrylic medium. The maximum angle to the substrate that the 60 micrometer flakes from FIGS. 15A-15F can take in the 10 micrometer thick medium is $\tan^{-1}(10/60)-9.5°$, but the 5 micrometer flakes can take up normal (90°) angles to the substrate. Consequently, the range of illumination angles resulting in constellations with similar intensity profiles will be much larger in FIGS. 17A-17F than in FIGS. 15A-15F.

Figure 17C:
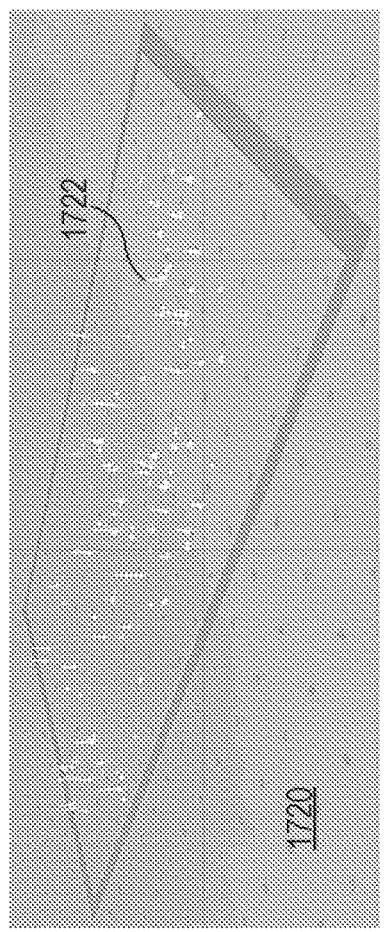
FIGS. 17A-17F depict how the intensity profiles of a pattern vary with illumination angle with relatively small reflective surfaces.
Figure 17F:
Figure 17B:
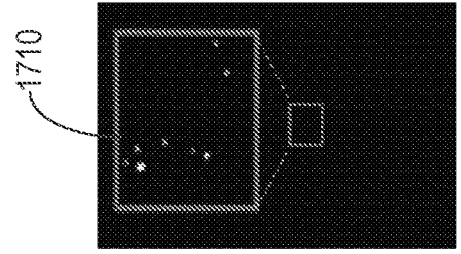
Figure 17A:
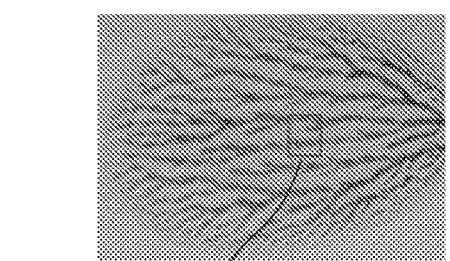
Figure 17E:
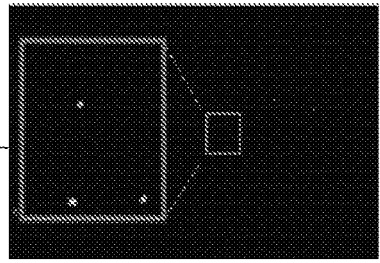
Figure 17D:
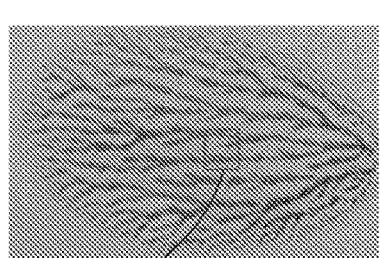

FIGS. 17A and 17D were taken with the same cell phone as in FIGS. 15A and 15D, in ambient room light at 30° left and right roll respectively. Similarly, the phone's internal position sensor and inclinometer to monitor the angles. The processed images in FIGS. 17B and 17E show an enlarged processed image of constellations 1710 in FIGS. 17A and 17D, respectively. The reflected light intensity profiles FIGS. 17C and 17F, which show constellations 1710 on backgrounds 1720 are not as high as in FIG. 15C due to the smaller size of the particles, but both constellations 1710 are clear, whereas the reflective surface can be difficult to identify in FIG. 15E. As expected, substantially different left and right roll angles produced different constellations 1710, resulting in different sizes of intensity peaks 1722 and on flat plains 1720.

Figure 18:
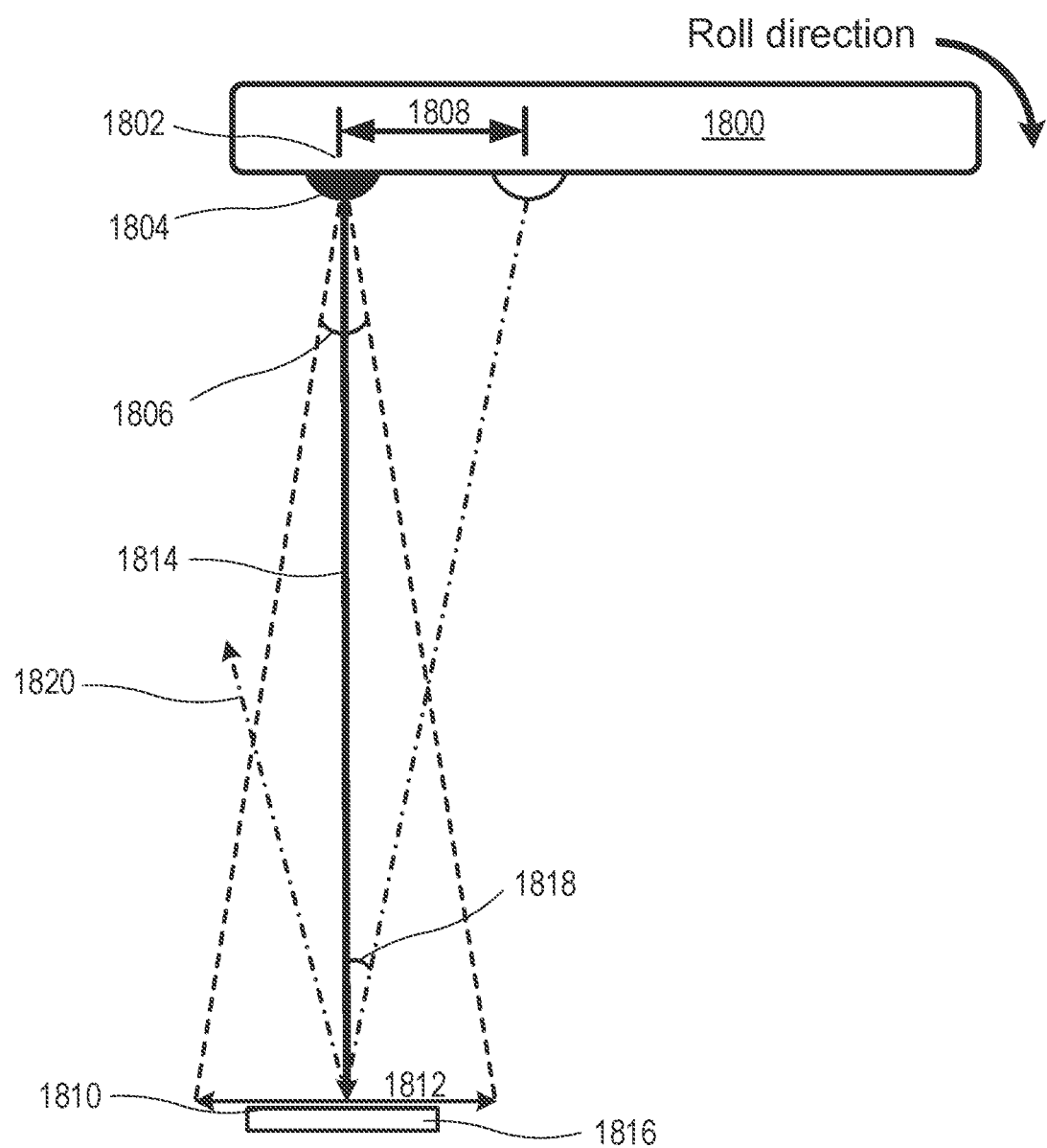
FIG. 18 depicts how the geometric and optic properties of a camera affect the authentication process.

In some implementations, the geometry of the optics of the camera can affect the constellations of the reflective surfaces. FIG. 18 depicts cell phone 1800 with camera 1802 having lens 1804. In one example, cell phone 1800 is a Samsung Galaxy Note 20, and lens 1804 has a numerical aperture of 0.17 leading to an angle of acceptance 1806 of 19.2°. The camera lens-to-flash spacing 1808 is 15 mm, and the distance between the lens 1804 and the pattern 1810 is 75 mm with a field of view 1812 of 25.4 mm. A scattering element directly under the camera would only appear to be maximally bright if it reflected light 1814 at a right angle to the substrate 1816 (an angle 1818 equal to 11.3° to the incident direction) into the lens 1804. Otherwise it would appear relatively dark because the reflected light 1820 would not reach the lens 1804. With 0° phone roll, a reflector with 0° inclination would therefore not appear bright, but a reflector inclination of 5.7° would result in a maximally bright spot. For a pattern 1810 having a length of 15 mm, together with this phone geometry and positioning, scattering elements at the right end (closest to the flash illuminator) that lie around 0° inclination will reflect light into the camera, and scattering elements at the left end (closest to the camera) that lie around 11.2° inclination will reflect light into the camera. Although this example provides specifics for the Samsung Galaxy Note 20, other cameras, including other cell phones with differing geometries, can be used.

In a first general aspect, identifying a test pattern includes:
positioning a test pattern in the field of view of a first imaging device, wherein the test pattern is on a first substrate and comprises a first multiplicity of particles that reflect or emit light;
illuminating the test pattern with light from a first light source, wherein the light from the first light source defines a first test angle of incidence with respect to the first substrate and a first test azimuthal angle with respect to an optical axis of the first imaging device;
obtaining, with the first imaging device, a first test image of light reflected by the first multiplicity of particles, wherein the first test image comprises first indicia associated with the first test angle of incidence and the first test azimuthal angle; and
comparing the first test image with a first reference image of a reference pattern obtained by a second imaging device, wherein the reference pattern is on a second substrate and comprises a second multiplicity of particles that reflect light, and the first reference image comprises second indicia associated with the second alignment feature and is obtained by illuminating the reference pattern with light from a reference light source that defines a first reference angle of incidence with respect to the second substrate and a first reference azimuthal angle with respect to an optical axis of the second imaging device.

As used herein, "optical axis" generally refers to a line passing through the center of curvature of a lens or spherical mirror of an imaging device (e.g., a camera) and parallel to an axis of symmetry.

Implementations of the first general aspect include one or more of the following features.

In some implementations, the test pattern or the first substrate includes a first fiducial mark and the first imaging device comprises a first alignment mark. Obtaining the first test image comprises aligning or superimposing the first fiducial mark and the first alignment mark. The reference pattern or the second substrate comprises a second fiducial mark, the second imaging device comprises a second alignment mark. Obtaining the first reference image comprises aligning or superimposing the second fiducial mark and the second alignment mark, Some implementations include altering the first alignment mark based on differences associated with i) the first test angle of incidence with respect to the first substrate and the first test azimuthal angle with respect to the optical axis of the first imaging device, and ii) the first reference angle of incidence with respect to the second substrate and the first reference azimuthal angle with respect to the optical axis of the second imaging device.

In some implementations, comparing the first test image with the first reference image comprises comparing the first indicia and the second indicia. The first indicia can include regions corresponding to reflected light in the first test image (e.g., a first subset of "bright spots" or a constellation as described herein), and the second indicia can include regions corresponding to reflected light in the first reference image (e.g., a second subset of "bright spots" or a constellation as described herein).

Some implementations include identifying the test pattern as the reference pattern based on overlap between the first indicia and the second indicia. That is, when the first and second indicia are sufficiently similar, the test pattern can be identified as the same as the reference pattern.

Some implementations include illuminating the test pattern with light from a second light source, wherein the light from the second light source defines a second test angle of incidence with respect to the substrate and a second test azimuthal angle with respect to the optical axis of the first imaging device, and obtaining a second test image of light reflected by the first multiplicity of particles.

Some implementations include comparing the second test image with a second reference image of the reference pattern, and the second reference image is obtained by illuminating the reference pattern with light from the reference light source at a second reference angle of incidence with respect to the second substrate and a second reference azimuthal angle with respect to the optical axis of the second imaging device.

Some implementations include obtaining more than two test images and comparing with more than two references images. Some examples include obtaining at least three, four, or five test images (e.g., 10, 1000, or 1000 test images) and comparing each test image with a corresponding reference image.

In some implementations, a difference between the first test azimuthal angle and the second test azimuthal angle is about 180° or less or about 90° or less.

In some implementations, positioning the test pattern includes positioning the test pattern in an enclosure configured to contain light from the first light source and inhibit reflection of stray light.

In some implementations, the first test angle of incidence with respect to the substrate is less than 40° or less than 20°.

In some implementations, comparing the first test image with the first reference image includes comparing a portion of the first test image with a corresponding portion of the first reference image.

In some implementations, the first light source is an LED light source. In some implementations, the first light comprises visible radiation, ultraviolet radiation, or infrared radiation.

In some implementations, obtaining the first test image incudes capturing the first test image with the first imaging device.

Some implementations include adjusting a position of the first light source with respect to the test pattern, adjusting a position of the first imaging device with respect to the test pattern, or both.

In some implementations, the first test angle of incidence is above a critical angle of reflection. In some implementations, the first test angle of incidence is below a critical angle of reflection.

In some implementations, the test pattern includes a barcode, a dendritic structure, or one or more alphanumeric characters. The barcode can be a one-dimensional barcode or a two-dimensional barcode. An example of a one-dimensional barcode is a linear barcode. An example of a two-dimensional barcode is a QR code.

In some implementations, the test pattern comprises an optically transparent covering opposite the first substrate. In some implementations, the first substrate is optically transparent.

In some implementations, the particles of the first multiplicity of particles and the particles of the second multiplicity of particles are fluorescent particles, and the first light source is an ultraviolet light source.

In some implementations, the pattern extends up to about 20 microns from a surface of the substrate.

In some implementations, the particles of the first multiplicity of particles and the second multiplicity of particles are in the shape of flakes. A maximum dimension of the particles of the first multiplicity of particles and the particles of the second multiplicity of particles is typically up to about 150 microns, up to about 100 microns, up to about 50 microns, or up to about 10 microns.

In a second general aspect, identifying a test pattern includes:
positioning an apparatus comprising a light source and an imaging device in a first orientation with respect to a test pattern on a substrate, wherein the test pattern comprises a multiplicity of particles that reflect or emit light and the first orientation of the device comprises a first pitch, a first roll, and a first yaw of the device with respect to the substrate;
illuminating the test pattern with light from the light source;
imaging light reflected by the multiplicity of particles with the imaging device to yield a first test image comprising a first multiplicity of bright regions;
positioning the apparatus comprising the light source and the imaging device in a second orientation with respect to the test pattern, wherein the second orientation comprises a second pitch, a second roll, and a second yaw of the device with respect to the substrate, wherein the first roll and the second roll are different;
illuminating the test pattern with the light source; and
imaging light reflected by the multiplicity of particles with the imaging device to yield a second test image comprising a second multiplicity of bright regions, wherein a location and intensity of the first multiplicity of bright regions in the first test image differs from a location and intensity of the second multiplicity of bright regions in the second test image.

As used herein, "optical axis" generally refers to a line passing through the center of curvature of a lens or spherical mirror of an imaging device (e.g., a camera) and parallel to an axis of symmetry.

Implementations of the second general aspect may include one or more of the following features.

Some implementations include comparing the first test image and the second test image with a corresponding reference images obtained from a reference pattern. Some implementations include obtaining more than two test images and comparing with more than two references images. Some examples include obtaining at least three, four, or five test images (e.g., 10, 1000, or 1000 test images) and comparing each test image with a corresponding reference image.

Some implementations include, based on the comparing, identifying the test pattern as the reference pattern.

Some implementations include obtaining more than two test images and comparing with more than two references images. Some examples include obtaining at least three, four, or five test images (e.g., 10, 1000, or 1000 test images) and comparing each test image with a corresponding reference image.

In some implementations, the test pattern comprises a barcode, a dendritic structure, or one or more alphanumeric characters. The barcode can be a one-dimensional barcode or a two-dimensional barcode. An example of a one-dimensional barcode is a linear barcode. An example of a two-dimensional barcode is a QR code.

In some implementations, the test pattern comprises an optically transparent covering opposite the substrate. In some implementations, the substrate is optically transparent.

In some implementations, the pattern extends up to about 20 microns from a surface of the substrate.

In some implementations, the particles are in the shape of flakes. A maximum dimension of the particles is typically up to about 150 microns, up to about 100 microns, up to about 50 microns, or up to about 10 microns.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of identifying a test pattern, the method comprising:
   positioning a test pattern in the field of view of a first imaging device, wherein the test pattern is on a first substrate and comprises a first multiplicity of particles that reflect or emit light;
   illuminating the test pattern with light from a first light source, wherein the light from the first light source defines a first test angle of incidence with respect to the first substrate and a first test azimuthal angle with respect to an optical axis of the first imaging device;
   obtaining, with the first imaging device, a first test image of light reflected by the first multiplicity of particles, wherein the first test image comprises first indicia associated with the first test angle of incidence and the first test azimuthal angle; and
   comparing the first test image with a first reference image of a reference pattern obtained by a second imaging device, wherein the reference pattern is on a second substrate and comprises a second multiplicity of particles that reflect light, and the first reference image comprises second indicia associated with the second alignment feature and is obtained by illuminating the reference pattern with light from a reference light source that defines a first reference angle of incidence with respect to the second substrate and a first reference azimuthal angle with respect to an optical axis of the second imaging device.

2. The method of claim 1, wherein:
   the test pattern or the first substrate comprises a first fiducial mark, the first imaging device comprises a first alignment mark, and obtaining the first test image comprises aligning or superimposing the first fiducial mark and the first alignment mark, and
   the reference pattern or the second substrate comprises a second fiducial mark, the second imaging device comprises a second alignment mark, and obtaining the first reference image comprises aligning or superimposing the second fiducial mark and the second alignment mark.

3. The method of claim 2, further comprising altering the first alignment mark based on differences associated with i) the first test angle of incidence with respect to the first substrate and the first test azimuthal angle with respect to the optical axis of the first imaging device, and ii) the first reference angle of incidence with respect to the second substrate and the first reference azimuthal angle with respect to the optical axis of the second imaging device.

4. The method of claim 1, wherein comparing the first test image with the first reference image comprises comparing the first indicia and the second indicia.

5. The method of claim 4, further comprising identifying the test pattern as the reference pattern based on overlap between the first indicia and the second indicia.

6. The method of claim 1, further comprising:
   illuminating the test pattern with light from a second light source, wherein the light from the second light source defines a second test angle of incidence with respect to the substrate and a second test azimuthal angle with respect to the optical axis of the first imaging device; and
   obtaining a second test image of light reflected by the first multiplicity of particles.

7. The method of claim 6, further comprising comparing the second test image with a second reference image of the reference pattern, and the second reference image is obtained by illuminating the reference pattern with light from the reference light source at a second reference angle of incidence with respect to the second substrate and a second reference azimuthal angle with respect to the optical axis of the second imaging device.

8. The method of claim 1, wherein comparing the first test image with the first reference image comprises comparing a portion of the first test image with a corresponding portion of the first reference image.

9. The method of claim 1, where in the first light comprises visible radiation, ultraviolet radiation, or infrared radiation.

10. The method of claim 1, wherein obtaining the first test image comprises capturing the first test image with the first imaging device.

11. The method of claim 1, further comprising adjusting a position of the first light source with respect to the test pattern.

12. The method of claim 1, further comprising adjusting a position of the first imaging device with respect to the test pattern.

13. The method of claim 1, wherein the test pattern comprises a barcode, a dendritic structure, or one or more alphanumeric characters.

14. The method of claim 13, wherein the barcode comprises a one-dimensional barcode or a two-dimensional barcode.

15. The method of claim 1, wherein the particles of the first multiplicity of particles and the particles of the second multiplicity of particles are fluorescent particles, and the first light source is an ultraviolet light source.

16. A method of identifying a test pattern, the method comprising:
    positioning an apparatus comprising a light source and an imaging device in a first orientation with respect to a test pattern on a substrate, wherein the test pattern comprises a multiplicity of particles that reflect or emit light and the first orientation of the device comprises a first pitch, a first roll, and a first yaw of the device with respect to the substrate;
    illuminating the test pattern with light from the light source;
    imaging light reflected by the multiplicity of particles with the imaging device to yield a first test image comprising a first multiplicity of bright regions;
    positioning the apparatus comprising the light source and the imaging device in a second orientation with respect to the test pattern, wherein the second orientation comprises a second pitch, a second roll, and a second yaw of the device with respect to the substrate, wherein the first roll and the second roll are different;
    illuminating the test pattern with the light source; and
    imaging light reflected by the multiplicity of particles with the imaging device to yield a second test image comprising a second multiplicity of bright regions,
    wherein a location and intensity of the first multiplicity of bright regions in the first test image differs from a location and intensity of the second multiplicity of bright regions in the second test image.

17. The method of claim 16, further comprising comparing the first test image and the second test image with corresponding reference images obtained from a reference pattern.

18. The method of claim 16, further comprising, based on the comparing, identifying the test pattern as the reference pattern.

19. The method of claim 16, wherein the test pattern comprises a barcode, a dendritic structure, or one or more alphanumeric characters.

20. The method of claim 19, wherein the barcode comprises a one-dimensional barcode or a two-dimensional barcode.

* * * * *